United States Patent
Aoki et al.

(10) Patent No.: US 9,621,779 B2
(45) Date of Patent: Apr. 11, 2017

(54) FACE RECOGNITION DEVICE AND METHOD THAT UPDATE FEATURE AMOUNTS AT DIFFERENT FREQUENCIES BASED ON ESTIMATED DISTANCE

(75) Inventors: Katsuji Aoki, Kanagawa (JP); Akihiro Nakanowatari, Osaka (JP); Shin Yamada, Kanagawa (JP); Hiroaki Yoshio, Kanagawa (JP); Takayuki Matsukawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 876 days.

(21) Appl. No.: 13/637,528

(22) PCT Filed: Nov. 8, 2010

(86) PCT No.: PCT/JP2010/006550
§ 371 (c)(1),
(2), (4) Date: Sep. 26, 2012

(87) PCT Pub. No.: WO2011/121688
PCT Pub. Date: Oct. 6, 2011

(65) Prior Publication Data
US 2013/0010095 A1    Jan. 10, 2013

(30) Foreign Application Priority Data
Mar. 30, 2010 (JP) .................................. 2010-077418

(51) Int. Cl.
*H04N 7/18*     (2006.01)
*G06K 9/46*     (2006.01)
(Continued)

(52) U.S. Cl.
CPC ..... *H04N 5/23212* (2013.01); *G06K 9/00268* (2013.01); *H04N 5/23219* (2013.01)

(58) Field of Classification Search
None
See application file for complete search history.

(56) References Cited

U.S. PATENT DOCUMENTS

2004/0207743 A1* 10/2004 Nozaki et al. ........... 348/333.12
2004/0208114 A1   10/2004 Lao et al.
(Continued)

FOREIGN PATENT DOCUMENTS

EP    1441497    7/2004
EP    1703440    9/2006
(Continued)

OTHER PUBLICATIONS

Extended European Search Report from European Patent Office (E.P.O.), mailed Nov. 15, 2013, in the corresponding European Patent Application.
(Continued)

*Primary Examiner* — Joseph Ustaris
*Assistant Examiner* — Edemio Navas, Jr.
(74) *Attorney, Agent, or Firm* — Greenblum & Bernstein, P.L.C.

(57) ABSTRACT

A face recognition device includes: an image capture unit, an area detection unit, a feature amount extraction unit, a distance estimation unit and a feature amount update unit. The image capture unit is configured to capture an image of an object. The area detection unit is configured to detect a given area of the object based on an image obtained as an image capture result of the image capture unit. The feature amount extraction unit is configured to extract a feature amount within the given area detected by the area detection unit. The distance estimation unit is configured to estimate a distance between the image capture unit and the given area. The feature amount update unit is configured to update the feature amount extracted by the feature amount extrac- (Continued)

tion unit based on the distance estimated by the distance estimation unit.

11 Claims, 20 Drawing Sheets

(51) Int. Cl.
*H04N 5/232* (2006.01)
*G06K 9/00* (2006.01)

(56) References Cited

U.S. PATENT DOCUMENTS

| | | |
|---|---|---|
| 2005/0063566 A1* | 3/2005 | Beek et al. .................. 382/115 |
| 2005/0129285 A1 | 6/2005 | Mino et al. |
| 2007/0253604 A1 | 11/2007 | Inoue et al. |
| 2008/0123906 A1* | 5/2008 | Mori et al. .................. 382/117 |
| 2009/0016577 A1 | 1/2009 | Mino et al. |
| 2009/0022403 A1* | 1/2009 | Takamori .............. G06T 7/2006 |
| | | 382/195 |
| 2009/0052747 A1 | 2/2009 | Kamiyama et al. |
| 2009/0080715 A1 | 3/2009 | van Beek et al. |
| 2009/0196461 A1* | 8/2009 | Iwamoto ...................... 382/103 |

FOREIGN PATENT DOCUMENTS

| | | |
|---|---|---|
| JP | 08-315145 | 11/1996 |
| JP | 11-252587 | 9/1999 |
| JP | 2001-016573 | 1/2001 |
| JP | 2005-129021 | 5/2005 |
| JP | 2006-146323 | 6/2006 |
| JP | 2007-156541 | 6/2007 |
| JP | 2008-009689 | 1/2008 |
| JP | 2008-015871 | 1/2008 |
| JP | 2009-025874 | 2/2009 |
| JP | 2009-223434 | 10/2009 |
| KR | 10088519 | 2/2009 |
| WO | 03/034361 | 4/2003 |

OTHER PUBLICATIONS

Viola et al., "Rapid Object Detection using a Boosted Cascade of Simple Features", Accepted Conference on Computer Vision and Pattern Recognition 2001, Dec. 2001, pp. 1-9.

Milborrow et al., "Locating Facial Features with an Extended Active Shape Model", Department of Electrical Engineering, University of Cape Town, South Africa, 2008, pp. I-XI.

Elagin et al., "Automatic Pose Estimation System for Human Faces based on Bunch Graph Matching Technology", IEEE Xplore, 1998, pp. 1-6.

International Search Report, mailed Nov. 30, 2010, for corresponding International Application No. PCT/JP2010/006550.

* cited by examiner (A1)
TIME T₁
CAPTURED IMAGE (B1)
TIME T₂
CAPTURED IMAGE (C1)
TIME T₃
CAPTURED IMAGE (A2)
TIME $T_1$ CAPTURED
FACE IMAGE
AND
FEATURE AMOUNT
TO BE UPDATED (B2)
TIME $T_2$ CAPTURED
FACE IMAGE
AND
FEATURE AMOUNT
TO BE UPDATED (C2)
TIME $T_3$ CAPTURED
FACE IMAGE
AND
FEATURE AMOUNT
TO BE UPDATED (A1)
TIME T₁
CAPTURED IMAGE (B1)
TIME T₂
CAPTURED IMAGE (C1)
TIME T₃
CAPTURED IMAGE (A2)
TIME $T_1$ CAPTURED
FACE IMAGE
AND
FEATURE AMOUNT
TO BE UPDATED (B2)
TIME $T_2$ CAPTURED
FACE IMAGE
AND
FEATURE AMOUNT
TO BE UPDATED (C2)
TIME $T_3$ CAPTURED
FACE IMAGE
AND
FEATURE AMOUNT
TO BE UPDATED (A1) TIME T₁ CAPTURED IMAGE  (B1) TIME T₂ CAPTURED IMAGE  (C1) TIME T₃ CAPTURED IMAGE

FIG. 25
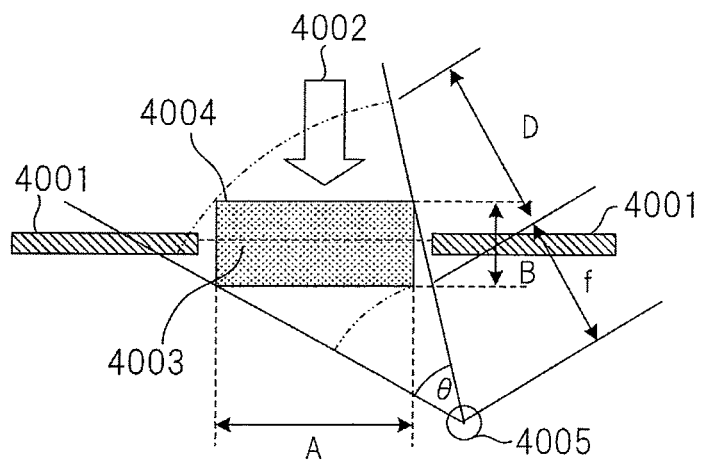
FIG. 26(A)  FIG. 26(B)
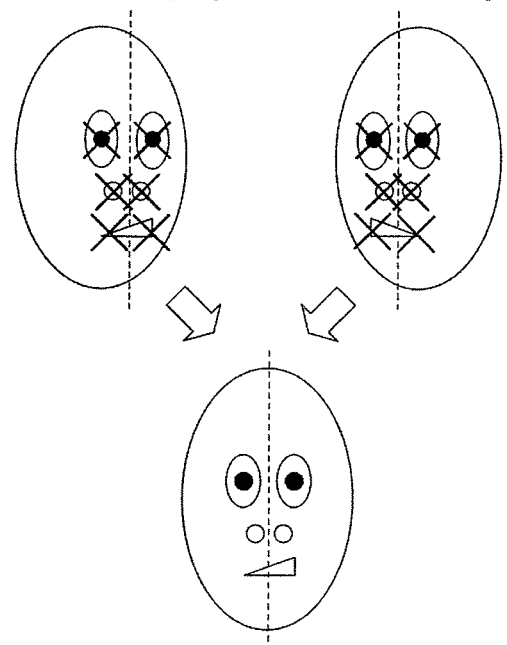
FIG. 26(C)

FACE RECOGNITION DEVICE AND METHOD THAT UPDATE FEATURE AMOUNTS AT DIFFERENT FREQUENCIES BASED ON ESTIMATED DISTANCE

TECHNICAL FIELD

The present invention relates to a face recognition device and a face recognition method used in a camera system for security or guest management of major clients capturing an image of an object such as a person to recognize the object.

BACKGROUND ART

Up to now, as a technique that identifies individual by conducting face recognition with the use of a plurality of sequential facial images, there are techniques disclosed in, for example, Patent Documents 1 to 3. First, Patent Document 1 discloses the installation and image capture conditions of a camera that can stably capture an image of a facial surface of a pedestrian.

FIG. 25 is a diagram illustrating an installation example of a pedestrian observation device disclosed in Patent Document 1. FIG. 25 is a diagram looking down at an entrance of a building from above. A person moves toward the entrance (between both of right and left walls 4001) (in a direction indicated by an arrow 4002). An essential observation area 4004 having a width A and a height B is set at a position over a pass line 4003 of the entrance connecting both of the right and left walls 4001 to each other, and the pass line 4003 is also set in the center of the essential observation area 4004. A direction and a field angle θ of a camera 4005 are set in the direction of the arrow 4002, which is a moving direction of the person, with respect to the pass line 4003. Also, a focal length of the camera 4005 is set between f and f+D illustrated in the figure. The conditions of "the camera installation position", "the direction and field angle of the camera", and "the focal length of the camera" are set so that the camera 4005 allows the essential observation area 4004 to fall within an image capture range, and can capture an image having the focal length within the image capture range. This makes it possible to stably capture the image of the face of the person who passes through the essential observation area 4004. Patent Document 1 discloses that an identification precision of the individual is improved by facially recognizing a plurality of images different in face direction, which are taken for the same person by a plurality of cameras.

On the other hand, Patent Document 2 and Patent Document 3 disclose a method in which a front image of the person is synthesized from a plurality of images different in face direction, which are taken for the same person by a plurality of cameras, through affine transform or field morphing, and face recognition is conducted by the aid of the synthesis result to identify the individual.

FIG. 26 is a diagram illustrating facial feature synthesis disclosed in Patent Document 2. FIGS. 26(A) and 26(B) illustrate facial images each having a different face direction, which are obtained by capturing an image of the same person from different cameras. Feature points of the face indicated by X-marks in the figures are detected by facial feature point search for the images of FIGS. 26(A) and 26(B). A front image illustrated in FIG. 26(C) is synthesized by affine transform on the basis of the detected facial feature point positions, and the face recognition is conducted by the aid of the synthesized front image to identify the individual.

In Patent Document 3, the front image is synthesized by not the affine transform but the field morphing, and the face recognition is conducted by the aid of the synthesized front image to identify the individual.

RELATED ART DOCUMENTS

Patent Documents

Patent Document 1: JP-A-2001-016573
Patent Document 2: JP-A-2006-146323
Patent Document 3: JP-A-2009-025874

SUMMARY OF THE INVENTION

Problem to be Solved by the Invention

However, the above-mentioned conventional face recognition techniques suffer from the following problems.

Patent Document 1 discloses only the location and the image capture conditions of the camera that can stably capture the image of the facial surface of a pedestrian. However, there is a case in which the camera cannot be installed at the disclosed position and in the disclosed direction, or the image capture cannot be conducted in the disclosed image capture conditions. In this case, the image of the facial surface cannot be stably captured. As a result, the face recognition goes wrong to reduce a precision of the individual identification. In the publication, the individual is identified by the face recognition from the plurality of images each having the different face direction, which are taken by the plurality of cameras, and the identification precision is improved by the aid of the identification result. However, Patent Document 1 fails to disclose how to use the result for improving the recognition precision.

In Patent Document 2 and Patent Document 3, the front image is synthesized by the affine transform or the field morphing on the basis of the detected facial feature point positions, and the face recognition is conducted by the aid of the synthesized front image to identify the individual. However, there is a case in which the facial feature points cannot be precisely detected depending on the direction of the face. This makes it difficult to obtain a precise front image, and the precision in the individual identification is reduced as in Patent Document 1.

The present invention has been made in view of the above circumstances, and an object of the present invention is to provide a face recognition device and a face recognition method which enable recognition with high precision.

Means for Solving the Problem

According to the present invention, there is provided a face recognition device including: an image capture unit configured to capture an image of an object; an area detection unit configured to detect a given area of the object based on an image obtained as an image capture result of the image capture unit; a feature amount extraction unit configured to extract a feature amount within the given area detected by the area detection unit; a distance estimation unit configured to estimate a distance between the image capture unit and the given area; and a feature amount update unit configured to update the feature amount extracted by the feature amount extraction unit based on the distance estimated by the distance estimation unit.

According to the above configuration, the distance estimation unit estimates the distance between the image capture unit and the object, and the feature amount update unit updates the feature amount according to the distance. As a result, the given area of the object can be recognized with high precision.

In the above configuration, the face recognition device further includes a search unit configured to compare the feature amount updated by the feature amount update unit with a feature amount held in advance to conduct search, and the given area is recognized based on a search result of the search unit.

In the above configuration, the face recognition device further includes a feature point position detection unit configured to detect feature point positions within the given area, and the distance estimation unit estimates the distance between the image capture unit and the given area based on an interval of the feature point positions detected by the feature point position detection unit.

According to the present invention, there is provided a face recognition device including: an image capture unit configured to capture an image of a person; a face detection unit configured to detect a face of the person based on an image obtained as an image capture result of the image capture unit; a feature point position detection unit configured to detect feature point positions within the face detected by the face detection unit; a feature amount extraction unit configured to extract a feature amount at each of the feature point positions detected by the feature point position detection unit; a distance estimation unit configured to estimate a distance between the image capture unit and the face; a feature amount update unit configured to update the feature amount extracted by the feature amount extraction unit based on the distance estimated by the distance estimation unit; and a search unit configured to compare the feature amount updated by the feature amount update unit with a feature amount held in advance to conduct search, and the face is recognized based on a search result of the search unit.

According to the above configuration, the distance estimation unit estimates the distance between the image capture unit and the face of the person, and the feature amount update unit updates the feature amount at each of the feature point positions within the face according to the distance. Also, the search unit compares the feature amount updated by the feature amount update unit with the feature amount held in advance to conduct search. As a result, the face of the person can be recognized with high precision.

In the above configuration, the distance estimation unit estimates the distance between the image capture unit and the face based on an interval of the feature point positions detected by the feature point position detection unit.

According to the present invention, there is provided a face recognition device including: an image capture unit configured to capture an image of a person; a face detection unit configured to detect a face of the person based on an image obtained as an image capture result of the image capture unit; a feature point position detection unit configured to detect feature point positions within the face detected by the face detection unit; a feature amount extraction unit configured to extract a feature amount at each of the feature point positions detected by the feature point position detection unit; a distance estimation unit configured to estimate a distance between the image capture unit and the face based on an interval of the feature point positions detected by the feature point position detection unit; an angle estimation unit configured to estimate a direction of the face; a feature amount update unit configured to update the feature amount extracted by the feature amount extraction unit based on the distance estimated by the distance estimation unit and the direction of the face estimated by the angle estimation unit; and a search unit configured to compare the feature amount updated by the feature amount update unit with a feature amount held in advance to conduct search, and the face is recognized based on a search result of the search unit.

According to the above configuration, the distance estimation unit estimates the distance between the image capture unit and the face of the person, and the feature amount update unit updates the feature amount at each of the feature point positions within the face based on the estimated distance and direction of the face. Also, the search unit compares the feature amount updated by the feature amount update unit with the feature amount held in advance to conduct search. As a result, the face of the person can be recognized with high precision. In particular, the face of the person can be recognized with higher precision since the direction of the face is taken into account.

In the above configuration, the angle estimation unit estimates the direction of the face based on a positional relationship of the feature point positions detected by the feature point position detection unit.

According to the present invention, there is provided a face recognition device including: an image capture unit configured to capture an image of a person; a face detection unit configured to detect a face of the person based on an image obtained as an image capture result of the image capture unit; a feature point position detection unit configured to detect feature point positions within the face detected by the face detection unit; a feature amount extraction unit configured to extract a feature amount at each of the feature point positions detected by the feature point position detection unit; a distance estimation unit configured to estimate a distance between the image capture unit and the face based on an interval of the feature point positions detected by the feature point position detection unit; a lightness detection unit configured to detect a lightness at each of the feature point positions detected by the feature point position detection unit; a feature amount update unit configured to update the feature amount extracted by the feature amount extraction unit based on the distance estimated by the distance estimation unit and the lightness at each of the feature point positions detected by the lightness detection unit; and a search unit configured to compare the feature amount updated by the feature amount update unit with a feature amount held in advance to conduct search, and the face is recognized based on the search result of the search unit.

According to the above configuration, the distance estimation unit estimates the distance between the image capture unit and the face of the person, and the lightness detection unit detects the lightness at each of the feature point positions within the face. Also, the search unit compares the feature amount updated by the feature amount update unit with the feature amount held in advance to conduct search. As a result, the face of the person can be recognized with high precision. In particular, the face of the person can be recognized with higher precision since the lightness at each of the feature point positions is taken into account.

According to the present invention, there is provided a face recognition method including: an image capture step of capturing an image of an object; an area detection step of detecting a given area of the object based on an image obtained as an image capture result in the image capture step; a feature amount extraction step of extracting a feature amount within the given area detected in the area detection step; a distance estimation step of estimating a distance between the image capture step and the given area; and a feature amount update step of updating the feature amount extracted in the feature amount extraction step based on the distance estimated in the distance estimation step.

According to the above method, the distance between the image capture unit and the object is estimated in the distance estimation step, and the feature amount is updated according to the distance in the feature amount update step. As a result, the given area of the object can be recognized with high precision.

Advantages of the Invention

According to the present invention, the given area of the object such as the face of the human can be recognized from the images obtained by image capture with high precision.

BRIEF DESCRIPTION OF THE DRAWINGS

FIG. 25 is a diagram illustrating an installation example of a conventional pedestrian observation device.

FIGS. 26(A) to 26(C) are diagrams illustrating a conventional face feature synthesis.

MODE FOR CARRYING OUT THE INVENTION

Hereinafter, a description will be given of preferred embodiments for carrying out the present invention in detail with reference to the drawings.

First Embodiment

Figure 1:
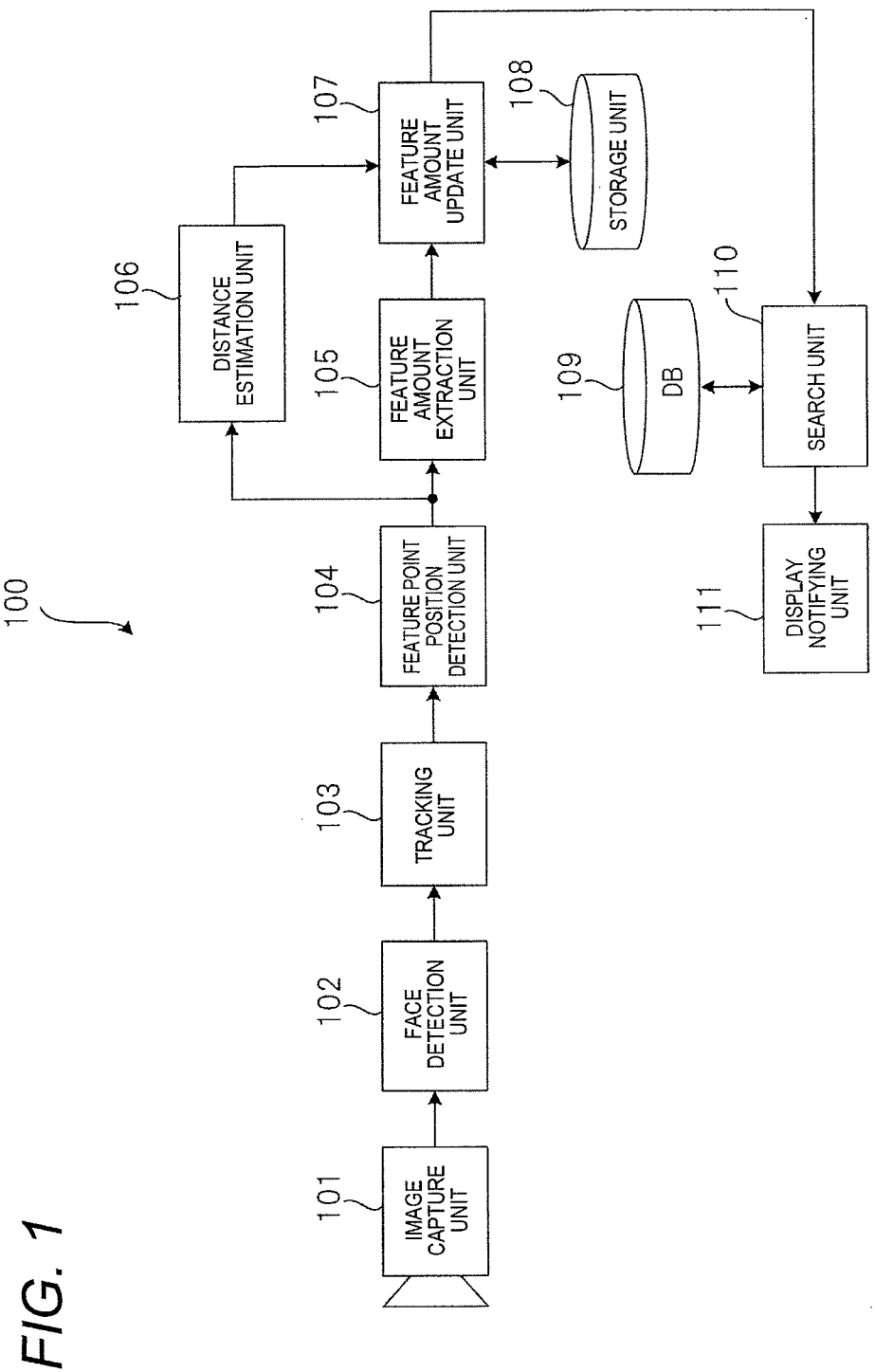
FIG. 1 is a block diagram illustrating an outline configuration of a face recognition device according to a first embodiment of the present invention.

FIG. 1 is a block diagram illustrating an outline configuration of a face recognition device according to a first embodiment of the present invention. In the figure, a face recognition device 100 according to this embodiment includes an image capture unit 101, a face detection unit 102, a tracking unit 103, a feature point position detection unit 104, a feature amount extraction unit 105, a distance estimation unit 106, a feature amount update unit 107, a storage unit 108, a database 109, a search unit 110, and a display notifying unit 111.

The image capture unit 101 captures an image of an object such as a person. The face detection unit 102 specifies an area of a face of the person from images as image capture results in the image capture unit 101. The tracking unit 103 allocates an identical ID number to facial images of the same person. The tracking unit 103 tracks a face area of the images sequentially captured to realize this function. The feature point position detection unit 104 detects feature point positions such as eyes, a nose, and a mouth of the face. The feature amount extraction unit 105 extracts a feature amount at each of the feature point positions detected by the feature point position detection unit 104. The distance estimation unit 106 estimates a distance between the image capture unit 101 and the captured face according to a distance relationship of the respective feature point positions of the face which are detected by the feature point position detection unit 104. The feature amount update unit 107 updates the feature amount extracted by the feature amount extraction unit 105 according to the distance estimated by the distance estimation unit 106. The storage unit 108 temporarily holds the feature amount extracted by the feature amount extraction unit 105, in the facial images of each same person to which the identical ID number is allocated by the tracking unit 103, and updates a part of the feature amount. The database (DB) 109 holds the facial feature amount of each individual used for face recognition. The search unit 110 compares the facial feature amount of the facial images which is updated by the feature amount update unit 107 with the facial feature amount of each individual which is held by the database 109 and searches to specify the individual. The display notifying unit 111 displays the search results of the search unit 110, and notifies a user of the results. As the search results, for example, "only facial image", "facial image and ID", or "facial image, ID, and warning" are displayed.

Figure 2:
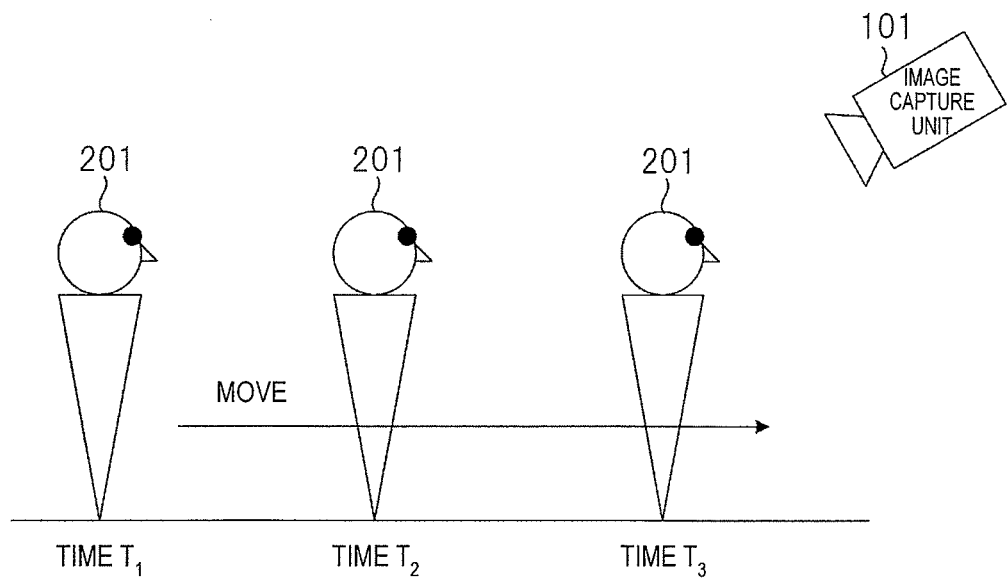
FIG. 2 is a diagram illustrating a relationship between a person of which an image is captured by the face recognition device in FIG. 1 and an image capture unit.

FIG. 2 is a diagram illustrating a relationship between a person of which an image is captured by the face recognition device 100 and the image capture unit 101 according to the first embodiment. A person 201 moves toward a direction in which the image capture unit 101 is installed. That is, the person 201 moves toward the image capture unit 101 from left to right in the figure. The image capture unit 101 captures the image of the person 201 at the respective times of a time $T_1$, a time $T_2$, and a time $T_3$.

Figure 3:
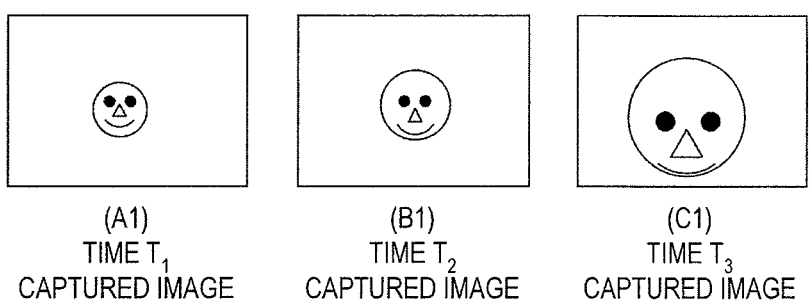
FIG. 3 is a diagram illustrating images captured at a time $T_1$, a time $T_2$, and a time $T_3$ in the face recognition device of FIG. 1.

FIG. 3 is a diagram illustrating images captured at the time $T_1$, the time $T_2$, and the time $T_3$ in the face recognition device 100 according to the first embodiment. In the figure, (A1) is a captured image at the time $T_1$, (B1) is a captured image at the time $T_2$, and (C1) is a captured image at the time $T_3$. As the person 201 comes closer to the image capture unit 101, the captured image becomes larger, and the face is gradually turned downward due to the existence of a depression angle.

Subsequently, the operation of the face recognition device 100 according to the first embodiment will be described.

As illustrated in FIG. 2, the image capture unit 101 captures the image of the person 201 at the time $T_1$, the time $T_2$, and the time $T_3$. (A1) of FIG. 3 illustrates an image captured at the time $T_1$, (B1) of FIG. 3 illustrates an image captured at the time $T_2$, and (C1) of FIG. 3 illustrates an image captured at the time $T_3$.

The face detection unit 102 detects the area of the face from the images captured by the image capture unit 101. In a face detection field, there has been reported that the area of the face can be detected from the image by a detection system based on an AdaBoost learning method (for example, Non-Patent Document 1: Paul Viola, Michael Jones, "Rapid Object Detection Using a Boosted Cascade of Simple Features", IEEE Computer Society Conference on Computer Vision and Pattern Recognition (CVPR), December of 2001, ISSN: 1063-6919, Vol. 1, p. 511 to 518). With the use of the above detection system, the face detection unit 102 detects the face area from the images captured by the image capture unit 101 to output the image of the face area. This detection system is given by way of example, and a system of the face detection used in the present invention is not limited to the above detection system. Any detection system is applicable if the face area can be specified from the image. For example, the face can be also detected by pattern matching.

The tracking unit 103 determines whether the faces of the respective face areas are of the same person, or not, on the basis of a variation in the position of the face area detected by the face detection unit 102 with time. In this case, even if the person to be captured moves, an image capture interval of the image capture unit 101 is sufficiently smaller than the amount of moving time of the person, the variation in the position of the face area on the respective captured images is small. For that reason, even if an image of a plurality of persons is captured, the face areas with small variation of the position on the captured images at the respective times T can be determined as the same person. The tracking unit 103 can determine whether the faces within the face areas output by the face detection unit 102 are of the same person, or not, through the above tracking method. The above tracking method is given by way of example, and the tracking method used in the present invention is not limited to the above tracking method. Any tracking method is applicable if the method can estimate that the faces of the respective face areas are of the same person. Also, aside from the above tracking method, it is possible to estimate that the faces of the face areas are of the same person according to information on consistency of the color or pattern of clothes captured at a portion below the face area, or a direction of the change in the position of the face area with time.

Through the above operation to the tracking unit 103, the face area images on the captured images at the respective times T are classified for each person. In the operation according to this embodiment, the classified face area image groups of the respective persons are classified for each person.

The feature point position detection unit 104 detects the feature point positions of the face within the face area image at each time T. In a face feature point position detection field, there has been reported that the feature points of the face can be detected from the face image through an adaptive shape model system (for example, Non-Patent Document 2: Stephen Milborrow and Fred Nicolls, "Locating Facial Features with an Extended Active Shape Model", Lecture Notes Computer Science; Vol. 5303, Proceedings of the 10$^{th}$ European Conference on Computer Vision Part IV).

Figure 4:
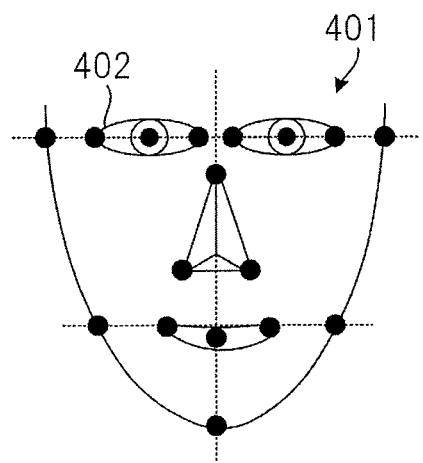
FIG. 4 is a diagram illustrating an example of feature points of a face acquired by the face recognition device of FIG. 1.

FIG. 4 is a diagram illustrating an example of the feature points of the face. In the figure, reference numeral 401 is a face, and 402 is feature points of the face. The feature points of the face are point positions indicative of positions and contour features of parts of the face such as eyebrows, eyes, a nose, a mouth, or a jaw, such as eye centers (or black eyes), inner corners of the eyes, tails of the eyes, a nasal ala, a top of a nose bridge, the center of the mouth, both sides of the mouth, temples, or points on a line of the jaw such as a jaw tip. The feature point position detection unit 104 detects the face feature points exemplified in FIG. 4 from the face area image at each time T, and outputs the feature point positions. The above detection system is given by way of example, and the system of detecting the face feature point position used in the present invention is not limited to the above detection system. Any detection system is applicable if the feature point positions can be specified from the face area image. For example, the feature point positions of the face can be detected even by the pattern matching.

The feature amount extraction unit 105 calculates the feature amount at each of the feature point positions of the face detected by the feature point position detection unit 104. In a face recognition field, there has been reported that the face can be recognized according to the feature amount calculated by the gabor wavelet transform with high precision (for example, Non-Patent Document 3: E. Elagin, J. Steffens, H. Neven, "Automatic pose Estimation System for Human Faces Based on Bunch Graph Matching Technology", Proceedings of the International Conference on Automatic Face and Gesture Recognition '98. pp. 136-141, 1998).

A Gabor wavelet filter coefficient is represented by (Mathematical Formula 1) (x and y are horizontal and vertical positions of pixels, k is a frequency, θ is an azimuth, and σ is a standard deviation of the Gauss function, and 2π). The frequency k and the azimuth θ are changed, and the coefficient obtained by the expression is convoluted on pixel values of the respective pixel positions x and y to execute the Gabor wavelet transform.

(Mathematical Formula 1)

$$\psi_{k,\theta}(x, y) = \frac{k^2}{\sigma^2} \exp\left(-\frac{k^2(x^2 + y^2)}{2\sigma^2}\right) \left[\exp(ik(x\cos\theta + y\sin\theta)) - \exp\left(-\frac{\sigma^2}{2}\right)\right] \quad (1)$$

The feature amount extraction unit 105 calculates the feature amount at each of the feature point positions of the face, which is detected by the feature point position detection unit 104, through the above Gabor wavelet transform, with respect to the respective frequency k components and the respective azimuths θ. The feature amount extraction by the above Gabor wavelet transform is given by way of example, and the feature amount extraction system used in the present invention is not limited to the above system. Any feature amount extraction system is applicable if the feature amount of the respective frequency components is extracted at the respective feature point positions of the face.

The distance estimation unit 106 estimates a distance between the image capture unit 101 and the face of the human on the basis of the feature point positions of the face which are detected by the feature point position detection unit 104. The distances between the respective feature point positions 402 in the face 401 illustrated in FIG. 4 become shorter as the distance between the image capture unit 101 and the face of the person is longer. With the use of this phenomenon, the distance between the image capture unit 101 and the face of the person can be estimated according to the distances between the respective feature point positions. Also, the size of the face to be captured becomes smaller as the distance from the image capture unit 101 to the face is farther. With the use of this phenomenon, the distance between the image capture unit 101 and the face of the person can be also estimated according to the size of the face area detected by the face detection unit 102. With the use of the above estimation method, the distance estimation unit 106 estimates the distance between the image capture unit 101 and the face of the person at the face area image at each time T, and outputs the result. The above distance estimation method is given by way of example, and the distance estimation method used in the present invention is not limited to the above distance estimation method. Any method is applicable if the distance between the image capture unit 101 and the face of the person can be estimated. The distance may be estimated by the aid of a stereo camera or an ultrasonic sensor which use no interval of the feature point positions.

Figure 5:
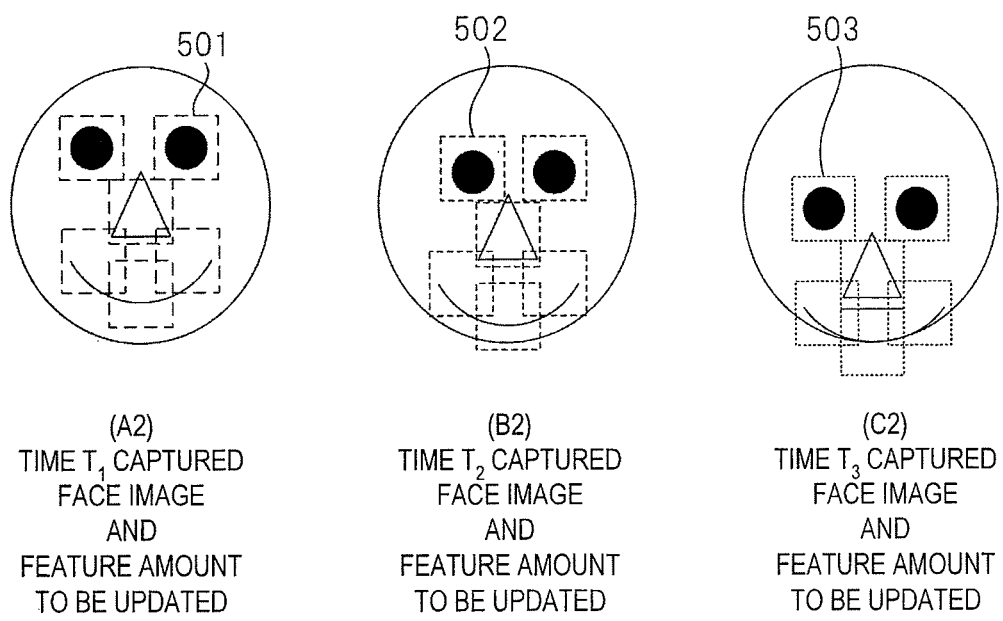
FIG. 5 is a diagram illustrating an example of a feature amount updated by a feature amount update unit in the face recognition device of FIG. 1.

The feature amount update unit 107 updates a part of the feature amount of the face of the same person, which is extracted by the feature amount extraction unit 105. FIG. 5 is a diagram illustrating an example of the feature amount updated by the feature amount update unit 107. In FIG. 5, (A2), (B2), and (C2) correspond to images (A1), (B1), and (C1) captured by the image capture unit 101 illustrated in FIG. 3 at the respective times T, respectively. In the image captured at a time $T_1$ illustrated in (A2) of FIG. 5, the distance between the image capture unit 101 and the face of the person is longer, and the size of the face image is smaller. In this case, only a feature amount 501 of a low frequency component at the feature point positions is updated. This is because the face image small in size does not largely include an intermediate frequency component and a high frequency component of the feature amount, and the reliability of the feature amount of those components is low.

In the image captured at a time $T_2$ illustrated in (B2) of FIG. 5, the distance between the image capture unit 101 and the face of the person is shorter than that illustrated in (A2), and the size of the face image is larger. In this case, only a feature amount 502 of the intermediate frequency component at the feature point positions is updated. This is because the size of the face image becomes larger, and therefore the intermediate frequency component is included in the image, and the reliability of the intermediate frequency component of the feature amount becomes higher. In the image captured at a time $T_3$ illustrated in (C2) of FIG. 5, the distance between the image capture unit 101 and the face of the person is shorter than that illustrated in (B2), and the size of the face image is larger. In this case, only a feature amount 503 of the high frequency component at the feature point positions is updated. This is because the size of the face image becomes larger, and therefore the high frequency component is included in the image, and the reliability of the high frequency component of the feature amount becomes higher. As described above, the feature amount update unit 107 updates only the feature amount of the frequency component higher in the reliability.

The storage unit 108 holds the feature amounts updated at the respective times T. The feature amount updated by the feature amount update unit 107 at the current time, and the feature amount updated before the current time, which is held in the storage unit 108, are output to the search unit 110. The search unit 110 compares the feature amount updated and output by the feature amount update unit 107 with the feature amount of each individual, which is held in the database 109, to conduct search. An evaluation formula used for comparison and search is represented in (Mathematical Formula 2) ($F_{n,\theta}$ is a feature amount of a frequency θ at an n-th feature point, which is output by the feature amount update unit 107, $f_{n,\theta}$ is a feature amount of the frequency θ at the n-th feature point, of the individual, which is held by the database 109, and S is an evaluation score of the individual).

(Mathematical Formula 2)

$$S = \frac{\sum_{n,\theta} F_{n,\theta} f_{n,\theta}}{\sqrt{\sum_{n,\theta} F_{n,\theta}^2 \sum_{n,\theta} f_{n,\theta}^2}} \quad (2)$$

In the feature amount updated and output by the feature amount update unit 107, the operation of the frequency component at the unupdated feature amount point is excluded from the calculation of (Mathematical Formula 2) (the operation result of that component is not included as an element value of summation indicated by Σ). The search unit 110 calculates the evaluation score obtained by the evaluation formula represented by (Mathematical Formula 2) for each individual data held in the database 109, and searches the individuals having the evaluation score of a given value or higher calculated. Then, the search result is notified a user of through the display notifying unit 111.

Figure 6:
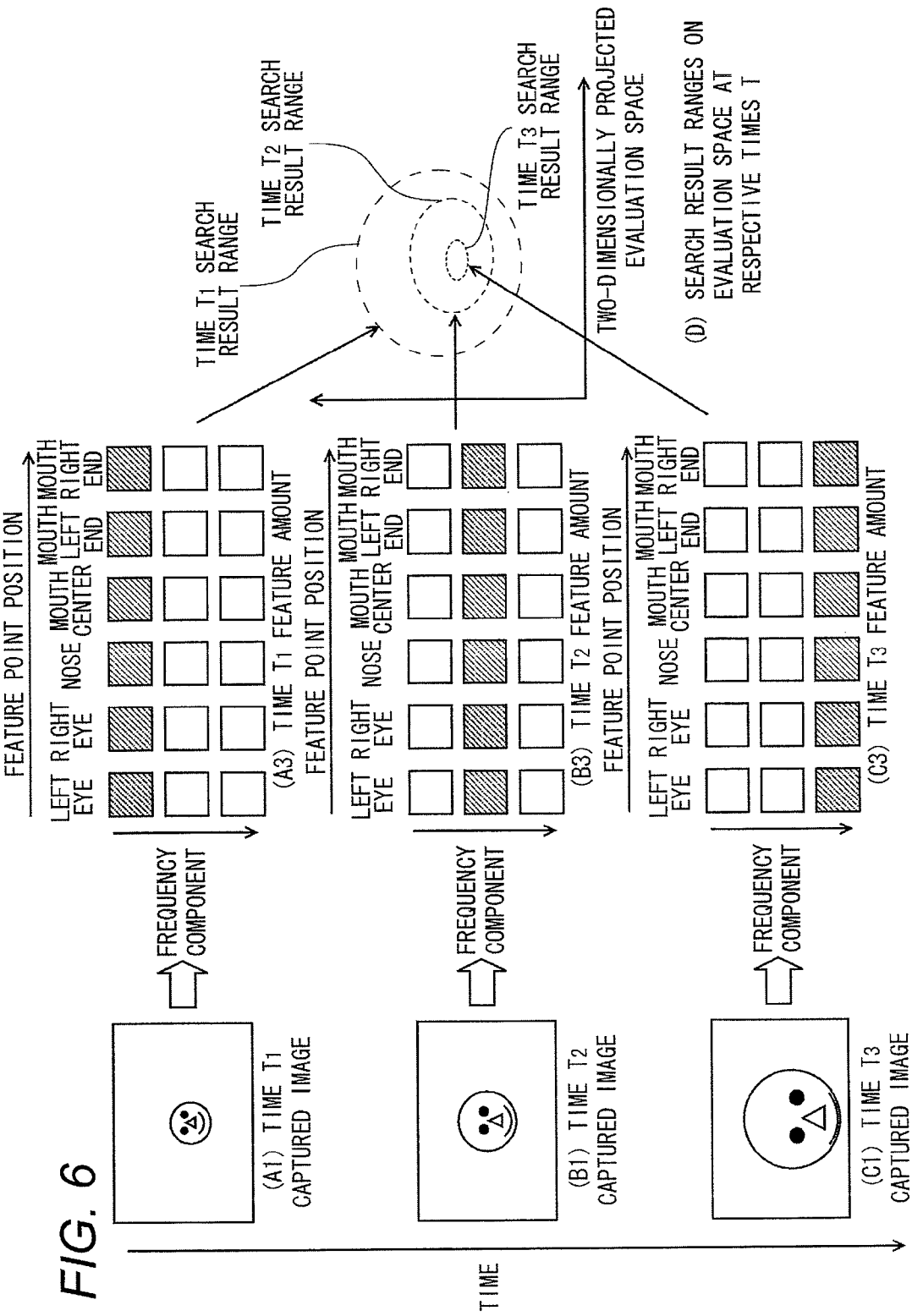
FIG. 6 is a diagram illustrating an example of captured images which are captured by the face recognition device of FIG. 1, feature amounts, and ranges on an evaluation space at the time $T_1$, the time $T_2$, and the time $T_3$.

FIG. 6 is a diagram illustrating an example of the captured images, the feature amounts, and the ranges on an evaluation space at the respective times T. In the figure, (A1), (B1), and (C1) are the images (A1), (B1), and (C1) captured by the image capture unit 101 illustrated in FIG. 3 at the respective times T, respectively. The feature amounts represented in (A3), (B3), and (C3) of FIG. 6 at the respective times T are the feature amounts updated by the feature amount update unit 107. The updated feature amounts are shaded (with chain lines). In FIG. 6, (D) is an image diagram when the search result ranges on the evaluation space represented by (Mathematical Formula 2) at the respective times T are projected in a two-dimensional space.

According to the above-mentioned operation to the feature amount update unit 107, as illustrated in (A3), (B3), and (C3) of FIG. 6, the feature amounts of the low frequency component, the intermediate frequency component, and the high frequency component at the respective feature point positions, are sequentially updated with elapsed time. In the search unit 110, the operation of the frequency components at the unupdated feature amount points is excluded from the calculation of (Mathematical Formula 2), and the individuals having the evaluation score of the given value or higher calculated are determined as the search results. Therefore, as illustrated in (D) of FIG. 6, the ranges on the evaluation space output as the search results become gradually narrowed.

Figure 7:
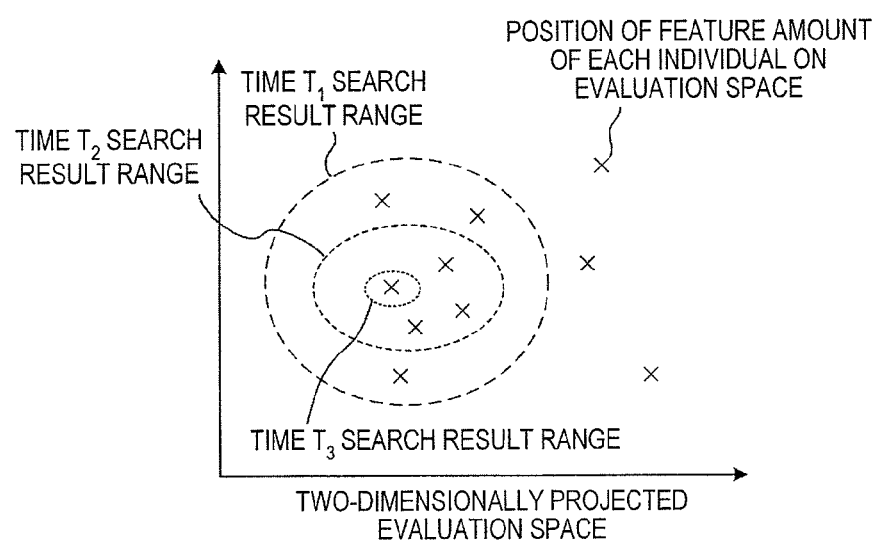
FIG. 7 is a diagram plotting positions of the feature amounts of the respective individuals held in a database on an image representing search result ranges at the times $T_1$, $T_2$, and $T_3$ illustrated in (D) of FIG. 6.

FIG. 7 is a diagram plotting positions of the feature amounts of the respective individuals held in the database 109 on the image representing the search result ranges at the respective times T illustrated in (D) of FIG. 6. At the time $T_1$, seven persons within the search result range of the time $T_1$ are determined as the search results. At the time $T_2$, the evaluation scores represented by (Mathematical Formula 2) are calculated for only the seven persons. At the time $T_2$, four persons within the search result range of the time $T_2$ are determined as the search results. Likewise, at the time $T_3$, the evaluation scores represented by (Mathematical Formula 2) are calculated for only the four persons. Then, at the time $T_3$, one person within the search result range of the time $T_3$ is determined as the search results. As described above, the search unit 110 refines the search. As a result, the search processing can be conducted at high speed. Also, the search unit 110 terminates the search processing if the number of persons as the search results is equal to or lower than a given number through the search refinement, and notifies the user of the search results through the display notifying unit 111. As a result, the search unit 110 can also provide the user with the search results at an earlier stage.

Figure 8:
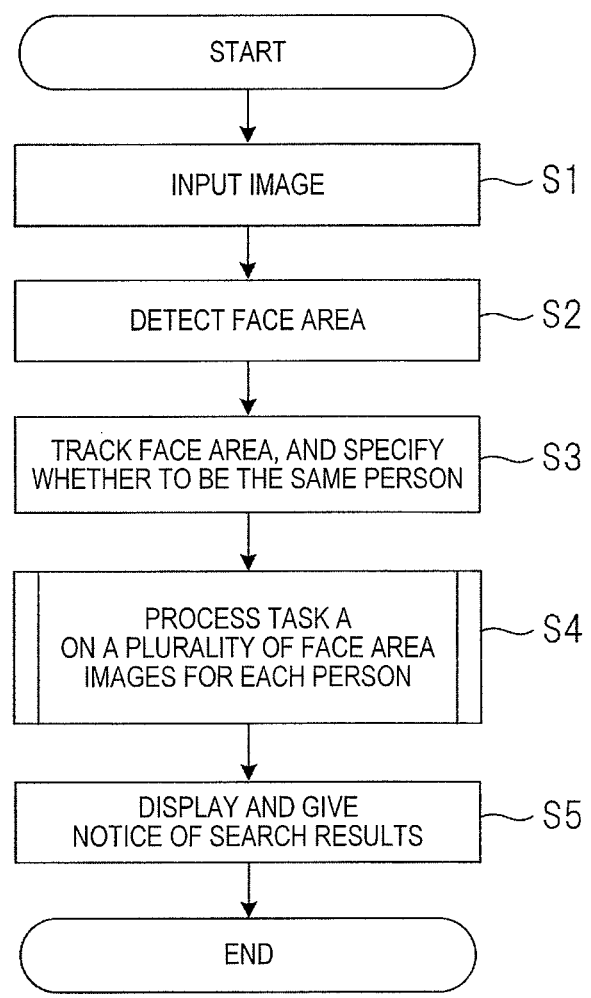
FIG. 8 is a flowchart illustrating main processing in the face recognition device of FIG. 1.

FIG. 8 is a flowchart illustrating main processing in the face recognition device 100 according to the first embodiment. In the figure, the image capture unit 101 first imports an image on which the person is captured (Step S1). Then, the face detection unit 102 detects the face area of the person from the image imported by the image capture unit 101 (Step S2). Upon detection of the face area of the person, the tracking unit 103 tracks the face area, and specifies whether the face area is of the same person, or not (Step S3). Then, the feature point position detection unit 104, the feature amount extraction unit 105, the distance estimation unit 106, the feature amount update unit 107, and the search unit 110 processes a task A on a plurality of face area images for each person (Step S4). After the processing of the task A has been conducted, the search results by the processing of the task A are displayed, and notified the user of (Step S5).

Figure 9:
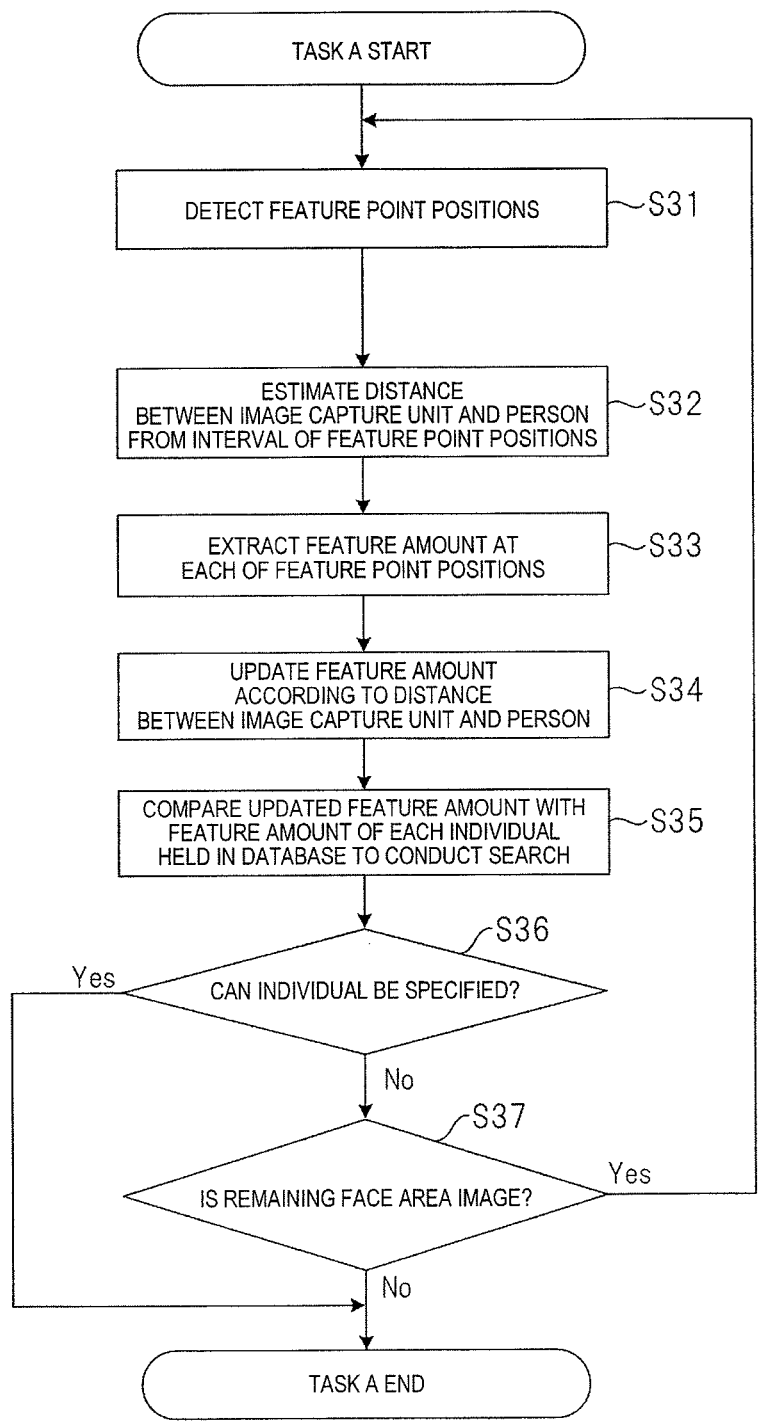
FIG. 9 is a flowchart illustrating processing of a task A in the main processing of FIG. 8.

FIG. 9 is a flowchart illustrating processing of the task A. In the figure, the feature point position detection unit 104 detects the feature point positions within the face of the person which is detected by the face detection unit 102 (Step S31). Then, the distance estimation unit 106 estimates the distance between the image capture unit 101 and the face of the person from the interval of the feature point positions detected by the feature point position detection unit 104 (Step S32). Then, the feature amount extraction unit 105 extracts the feature amount at each of the feature point positions detected by the feature point position detection unit 104 (Step S33). The distance estimation unit 106 estimates the distance between the image capture unit 101 and the face of the person, and the feature amount extraction unit 105 extracts the feature amount at each of the feature point positions. Thereafter, the feature amount update unit 107 updates the feature amount extracted by the feature amount extraction unit 105 according to the distance estimated by the distance estimation unit 106 (Step S34). After the feature amount has been updated according to the distance between the image capture unit 101 and the face of the person, the search unit 110 compares the feature amount updated by the feature amount update unit 107 with the feature amount of each individual held by the database 109 to conduct search (Step S35). Then, the search unit 110 determines whether the individual can be specified by the comparison and search processing, or not (Step S36). If the individual can be specified by this determination, the search unit 110 completes this processing, and if the individual cannot be specified, the search unit 110 determines whether there is a remaining face area image, or not (Step S37). If there is no remaining face area image as a result of the determination, the search unit 110 completes this processing. If there is the remaining face area image, the search unit 110 returns to Step S31, and repeats the same processing as described above.

Thus, according to the face recognition device 100 of the first embodiment, the distance estimation unit 106 estimates the distance between the image capture unit 101 and the face of the person. According to the estimated distance, the feature amount update unit 107 updates only the feature amount of the frequency component with reliability at each of the feature point positions, and the search unit 110 compares the feature amount updated by the feature amount update unit 107 with the feature amount of each individual held in the database 109 to conduct search. As a result, the face of the person can be recognized with high precision. Further, the search result range is narrowed with an increase in the number of feature amounts updated with elapsed time, and the search unit 110 conducts the search refinement on the previous search results. As a result, the search processing can be conducted at high speed. Furthermore, the search unit 110 terminates the search processing if the number of persons within the search result range narrowed with the elapsed time is equal to or lower than the given number, and notifies the user of the search results through the display notifying unit 111. As a result, the search unit 110 can provide the user with the search results at an earlier stage.

Second Embodiment

Figure 10:
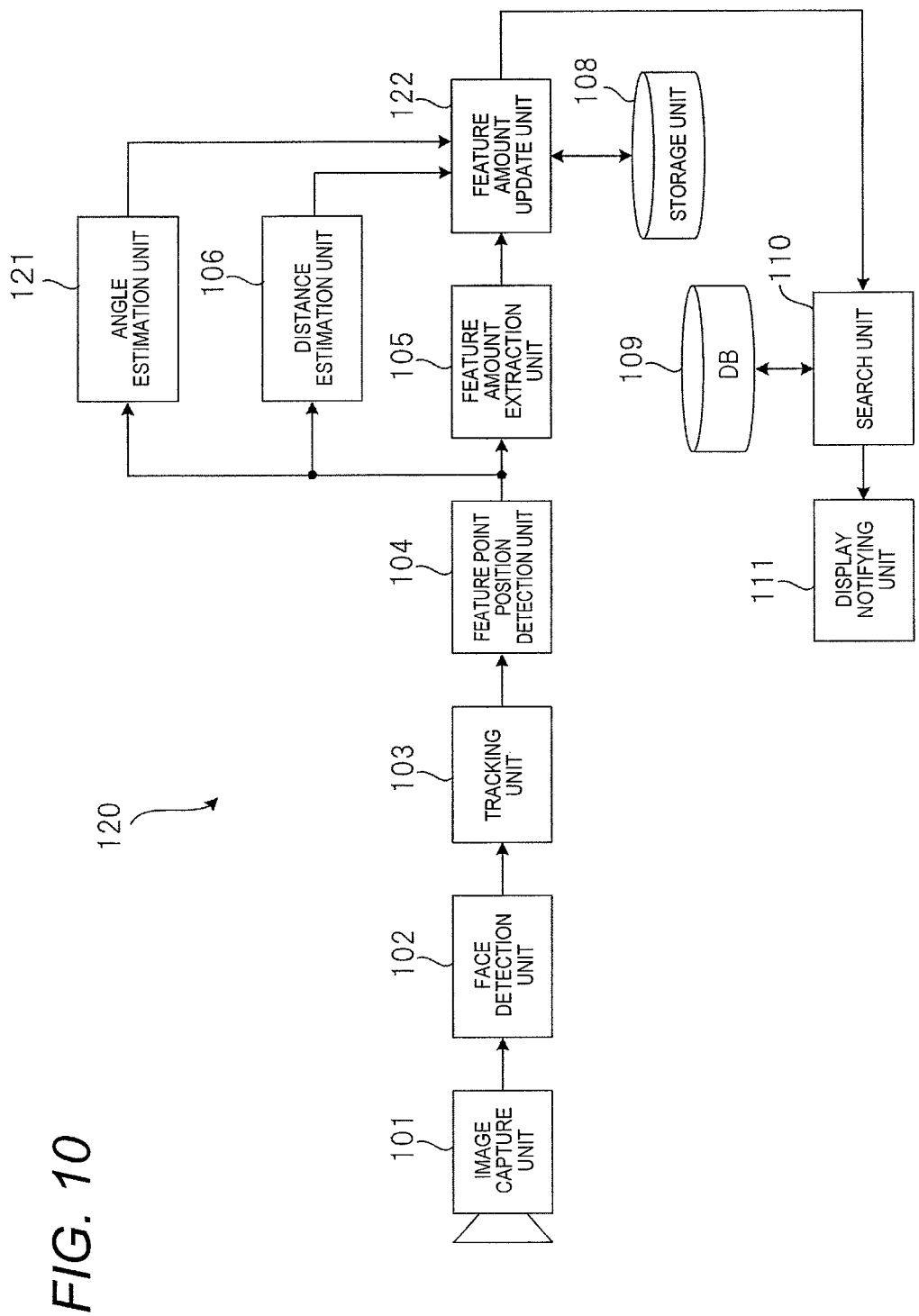
FIG. 10 is a block diagram illustrating an outline configuration of a face recognition device according to a second embodiment of the present invention.

FIG. 10 is a block diagram illustrating an outline configuration of a face recognition device according to a second embodiment of the present invention. In the figure, parts common to those of the face recognition device 100 according to the above-mentioned first embodiment are denoted by the same symbols.

In FIG. 10, a face recognition device 120 according to the second embodiment adds an angle estimation unit 121 to the same configuration as that of the face recognition device 100 according to the above-mentioned first embodiment. The angle estimation unit 121 estimates a direction of the face from a positional relationship of the respective feature points of the face, which are detected by the feature point position detection unit 104. A feature amount update unit 122 updates the feature amount extracted by the feature amount extraction unit 105 according to the distance estimated by the distance estimation unit 106 and the direction of the face estimated by the angle estimation unit 121.

Figure 11:
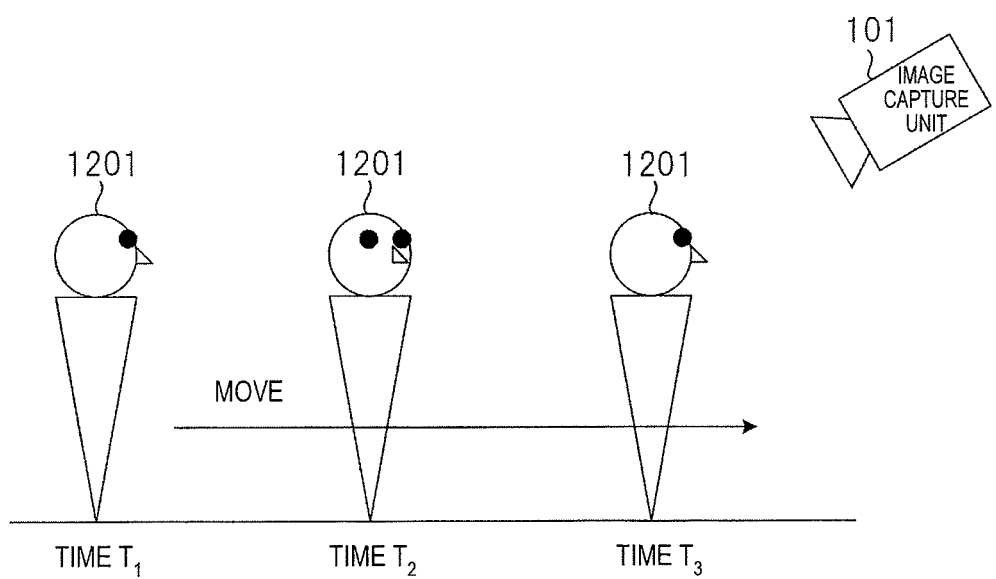
FIG. 11 is a diagram illustrating a relationship between a person captured by the face recognition device in FIG. 10 and an image capture unit.

FIG. 11 is a diagram illustrating a relationship between a person captured by the face recognition device 120 of the second embodiment and the image capture unit 101. A person 1201 moves toward a direction in which the image capture unit 101 is installed. That is, the person 1201 moves toward the image capture unit 101 from left to right in the figure. The image capture unit 101 captures the image of the person 1201 at the time $T_1$, the time $T_2$, and the time $T_3$.

Figure 12:
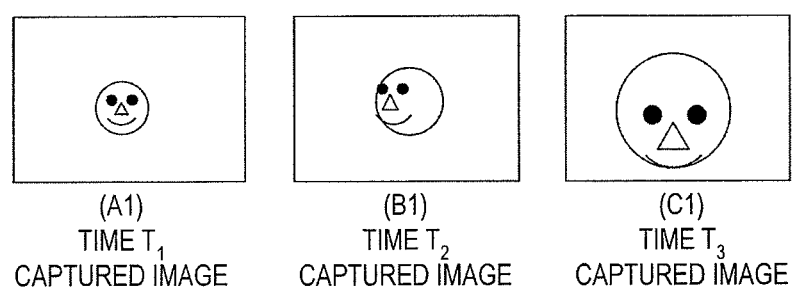
FIG. 12 is a diagram illustrating images captured at a time $T_1$, a time $T_2$, and a time $T_3$ in the face recognition device of FIG. 10.

FIG. 12 is a diagram illustrating images captured at the time $T_1$, the time $T_2$, and the time $T_3$ in the face recognition device 120 according to the second embodiment. In the figure, (A1) is a captured image at the time $T_1$, (B1) is a captured image at the time $T_2$, and (C1) is a captured image at the time $T_3$. As the person 1201 comes closer to the image capture unit 101, the captured image becomes larger, and the face is gradually turned downward due to the existence of the depression angle.

The image capture unit 101 captures the person 1201 at the respective times T in FIG. 11. (A1) of FIG. 12 illustrates an image captured at the time $T_1$, (B1) of FIG. 12 illustrates an image captured at the time $T_2$, and (C1) of FIG. 12 illustrates an image captured at the time $T_3$.

Figure 13:
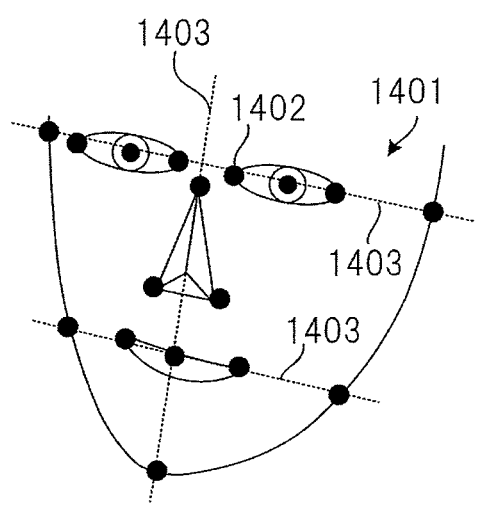
FIG. 13 is a diagram illustrating a face turned toward obliquely upper left.

As described above, the angle estimation unit 121 estimates the direction of the face from the positional relationship of the respective feature point positions of the face, which are detected by the feature point position detection unit 104. FIG. 13 is a diagram illustrating a face 1401 turned toward obliquely upper left. Angles between the respective broken lines 1403 that pass through the respective feature point positions illustrated in the figure, and distance ratios between the respective feature point positions are different depending on the direction of the face. With the use of this fact, the face direction can be estimated according to the respective feature point positions.

Also, three-dimensional position models at the respective feature point positions are prepared in advance, and a three-dimensional pose expression represented by (Mathematical Formula 3) is applied to the three-dimensional position models (X and Y are parallel movements in the horizontal and vertical directions, $A_n$, $B_n$, and $C_n$ are positions of the respective feature points n of the three-dimensional position models, $\theta_p$, $\theta_t$, and $\theta_r$ are three-dimensional rotating angles, and a function R( ) is a three-dimensional rotating function. S is a scale coefficient, a function P ( ) is a function that projects the three-dimensional position on a two-dimensional position, and $X_n$ and $Y_n$ are the two-dimensional positions of the respective feature points n after projection). In this case, even if the angles $\theta_p$, $\theta_t$, and $\theta_r$ (and scale S, parallel movements X and Y) such that the position error evaluations represented by (Mathematical Formula 4) ($x_n$ and $y_n$ are horizontal and vertical positions of the respective feature points n, which are detected by the feature point position detection unit 104) become minimized are obtained, the face direction can be estimated.

(Mathematical Formula 3)

$$\begin{bmatrix} X_n \\ Y_n \end{bmatrix} = P\left( \begin{bmatrix} S & 0 & 0 \\ 0 & S & 0 \\ 0 & 0 & S \end{bmatrix} R(\theta_p, \theta_t, \theta_r) \begin{bmatrix} A_n \\ B_n \\ C_n \end{bmatrix} \right) + \begin{bmatrix} X \\ Y \end{bmatrix} \quad (3)$$

(Mathematical Formula 4)

$$E = \sum_n ((X_n - x_n)^2 + (Y_n - y_n)^2) \quad (4)$$

The angle estimation unit 121 estimates the face direction of the face area image at each time T, and outputs the direction by the aid of the above angle estimation method. The above estimation method is given by way of example, and the angle estimation method used in the present invention is not limited to the above angle estimation method, but any method is applicable if the angle of the face can be estimated. The angle of the face may be estimated by acquiring information from an ultrasonic sensor or a gyro sensor worn on the person with no use of the feature point positions.

Figure 14:
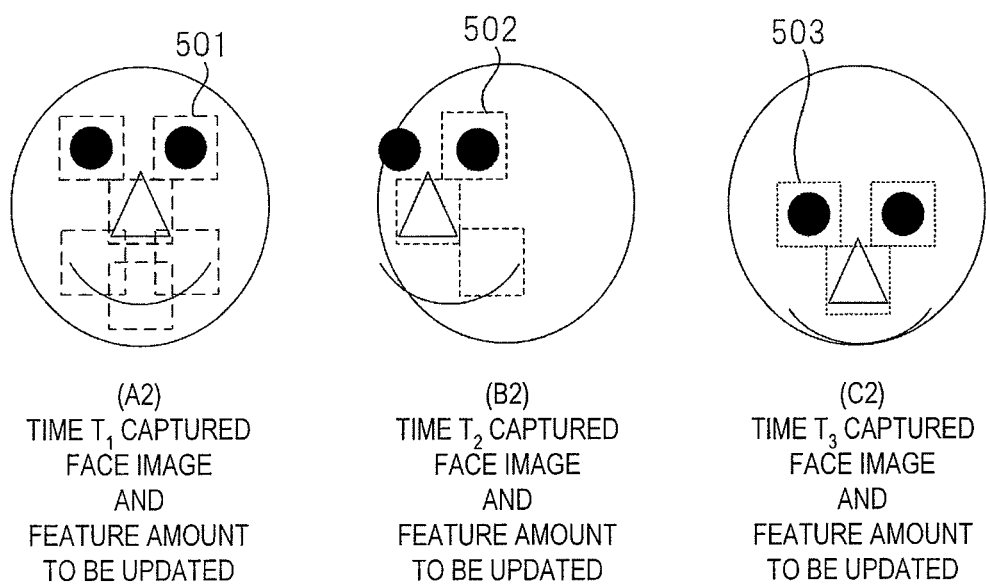
FIG. 14 is a diagram illustrating an example of the feature amount updated by a feature amount update unit in the face recognition device of FIG. 10.

The feature amount update unit 122 updates a part the feature amount of the face of the same person, which is extracted by the feature amount extraction unit 105. FIG. 14 is a diagram illustrating an example of the feature amount updated by the feature amount update unit 122. In the figure, (A2), (B2), and (C2) correspond to the images (A1), (B1), and (C1) captured by the image capture unit 101 illustrated in FIG. 12 at the respective times T, respectively. In the image captured at the time $T_1$ illustrated in (A2) of FIG. 14, the distance between the image capture unit 101 and the face of the person is longer, and the size of the face image is smaller. In this case, as in the above-mentioned first embodiment, only the feature amount 501 of the low frequency component at the feature point positions is updated. Also, in the image captured at the time $T_1$ illustrated in (A2) of FIG. 14, the front of the face substantially opposes the image capture unit 101, and the parts of the face also substantially opposes the image capture unit 101. In this case, the feature amounts of the feature points of all the parts in the face are updated.

In the image captured at the time $T_2$ illustrated in (B2) of FIG. 14, the distance between the image capture unit 101 and the face of the person is shorter than that illustrated in (A2), and the size of the face image is larger. In this case, as in the above-mentioned first embodiment, only the feature amount 502 of the intermediate frequency component at the feature point positions is updated. In the image captured at the time $T_2$ illustrated in (B2) of FIG. 14, the face turns to the right, and only the parts on a right side of the face substantially opposes the image capture unit 101. In this case, only the feature amount of the feature points of the parts on the right side of the face is updated.

In the image captured at the time $T_3$ illustrated in (C2) of FIG. 14, the distance between the image capture unit 101 and the face of the person is shorter than (B2), and the size of the face image is larger. In this case, as in the above-mentioned first embodiment, only the feature amount 503 of the high frequency component at the feature point positions is updated. In the image captured at the time $T_3$ illustrated in (C2) of FIG. 14, the face turns downward, and only the parts on an upper side of the face substantially opposes the image capture unit 101. In this case, only the feature amount of the feature points of the parts on the upper side of the face is updated.

As described above, the feature amount update unit 122 updates only the feature amount of the frequency component with high reliability, and only the feature amount of the feature point positions of the face parts that oppose the image capture unit 101 with high face authentication precision, as in the above-mentioned first embodiment.

Figure 15:
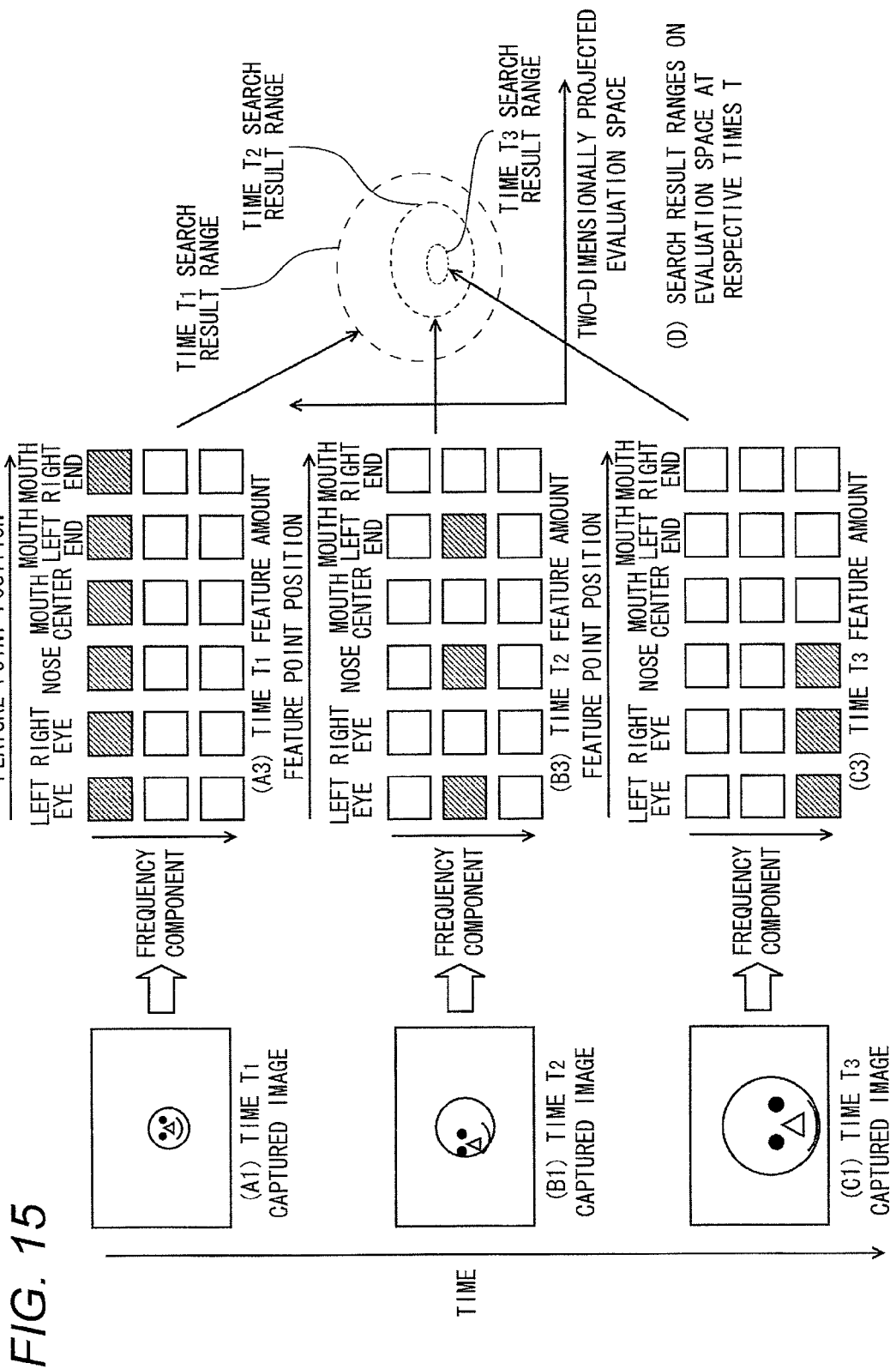
FIG. 15 is a diagram illustrating an example of captured images which are captured by the face recognition device of FIG. 10, feature amounts, and ranges on an evaluation space at the time $T_1$, the time $T_2$, and the time $T_3$.

The operation of the storage unit 108, the database 109, the search unit 110, and the display notifying unit 111 is identical with that in the face recognition device 100 of the above-mentioned first embodiment. FIG. 15 is a diagram illustrating an example of the captured images, the feature amounts, and the ranges on the evaluation space at the respective times T. In the figure, (A1), (B1), and (C1) are the images (A1), (B1), and (C1) captured by the image capture unit 101 illustrated in FIG. 12 at the respective times T. The feature amounts represented in (A3), (B3), and (C3) of FIG. 15 at the respective times T are the feature amounts updated by the feature amount update unit 122. The updated feature mounts are shaded (with chain lines). In FIG. 15, (D) is a diagram illustrating an image when the search result ranges on the evaluation space represented by (Mathematical Formula 2) at the respective times T are projected in a two-dimensional space.

According to the above-mentioned operation to the feature amount update unit 122, as illustrated in (A3), (B3), and (C3) of FIG. 15, as in the above-mentioned first embodiment, the feature amounts of the low frequency component, the intermediate frequency component, and the high frequency component at the respective feature point positions, are sequentially updated with elapsed time. Also, only the feature amount of the feature points of the face parts that oppose the image capture unit 101 is sequentially updated.

In the search unit 110, the operation of the frequency components of the unupdated feature points and feature amounts is excluded from the calculation of (Mathematical Formula 2), and the individuals having the evaluation score of the given value or higher calculated are determined as the search results. Therefore, as illustrated in (D) of FIG. 15, the ranges on the evaluation space output as the search results become gradually narrowed.

Figure 16:
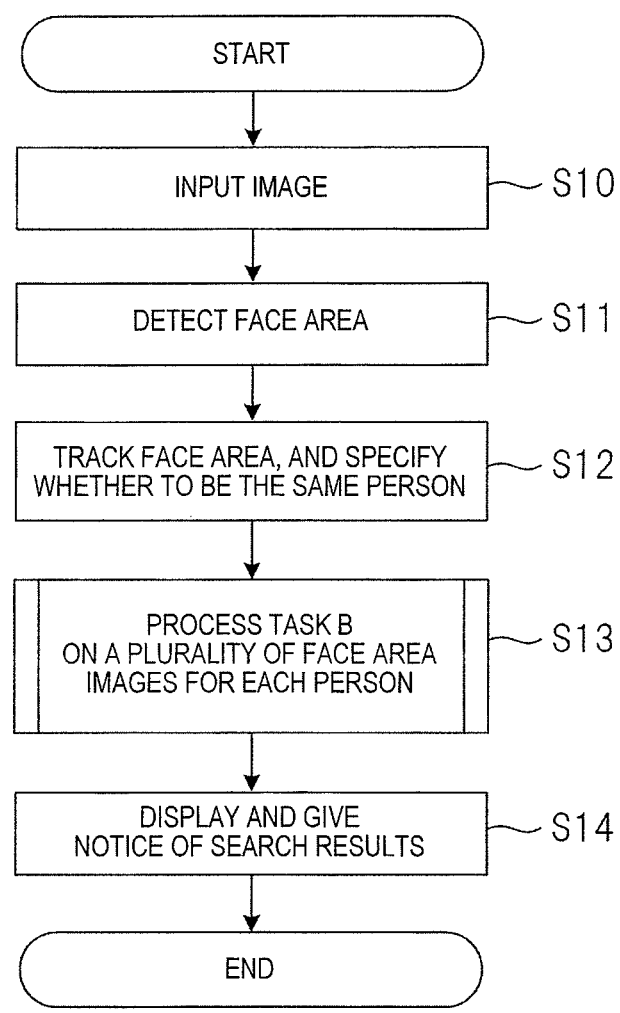
FIG. 16 is a flowchart illustrating main processing in the face recognition device of FIG. 10.

FIG. 16 is a flowchart illustrating main processing in the face recognition device 120 according to the second embodiment. In the figure, the image capture unit 101 first imports an image on which the person is captured (Step S10). Then, the face detection unit 102 detects the face area of the person from the image imported by the image capture unit 101 (Step S11). Upon detection of the face area of the person, the tracking unit 103 tracks the face area, and specifies whether the face area is of the same person, or not (Step S12). Then, the feature point position detection unit 104, the feature amount extraction unit 105, the distance estimation unit 106, the angle estimation unit 121, the feature amount update unit 122, and the search unit 110 processes a task B on a plurality of face area images for each person (Step S13). After the processing of the task B has been conducted, the search results by the processing of the task B are displayed, and notified the user of (Step S14).

Figure 17:
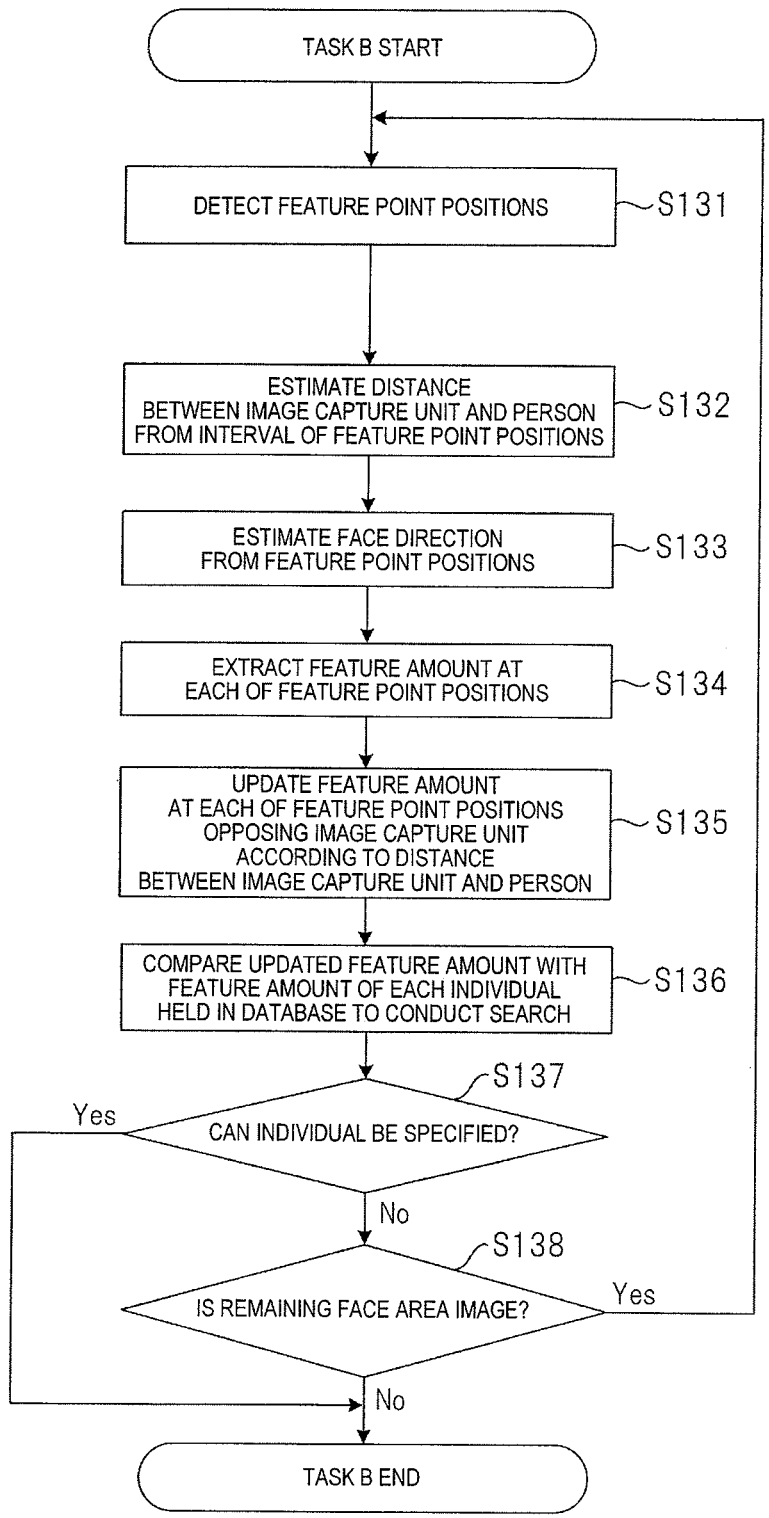
FIG. 17 is a flowchart illustrating processing of a task B in the main processing of FIG. 16.

FIG. 17 is a flowchart illustrating processing of the task B. In the figure, the feature point position detection unit 104 detects the feature point positions within the face of the person which is detected by the face detection unit 102 (Step S131). Then, the distance estimation unit 106 estimates the distance between the image capture unit 101 and the face of the person from the interval of the feature point positions detected by the feature point position detection unit 104 (Step S132). Then, the angle estimation unit 121 estimates the direction of the face of the person from the positional relationship of the feature point positions detected by the feature point position detection unit 104 (Step S133). Further, the feature amount extraction unit 105 extracts the feature amount at each of the feature point positions detected by the feature point position detection unit 104 (Step S134). The distance estimation unit 106 estimates the distance between the image capture unit 101 and the face of the person, the angle estimation unit 121 estimates the face direction from the feature point positions, and the feature amount extraction unit 105 extracts the feature amount at each of the feature point positions. Thereafter, the feature amount update unit 122 updates the feature amount extracted by the feature amount extraction unit 105 according to the distance estimated by the distance estimation unit 106 and the direction of the face estimated by the angle estimation unit 121 (Step S135). After the feature amount at each of the feature point positions that oppose the image capture unit 101 has been updated according to the distance between the image capture unit 101 and the face of the person, the search unit 110 compares the feature amount updated by the feature amount update unit 122 with the feature amount of each individual held by the database 109 to conduct search (Step S136). Then, the search unit 110 determines whether the individual can be specified by the comparison and search processing, or not (Step S137). If the individual can be specified by this determination, the search unit 110 completes this processing, and if the individual cannot be specified, the search unit 110 determines whether there is a remaining face area image, or not (Step S138). If there is no remaining face area image as a result of the determination, the search unit 110 completes this processing. If there is the remaining face area image, the search unit 110 returns to Step S131, and repeats the same processing as described above.

Thus, according to the face recognition device 120 of the second embodiment, the distance estimation unit 106 estimates the distance between the image capture unit 101 and the face of the person. Also, the angle estimation unit 121 estimates the direction of the face from the positional relationship of the feature point positions within the face. According to the estimated distance and the direction of the face, the feature amount update unit 122 updates the feature amount at each of the feature point positions within the face, and the search unit 110 compares the feature amount updated by the feature amount update unit 122 with the feature amount of each individual held in the database 109 to conduct search. As a result, the face of the person can be recognized with high precision. Further, as in the above-mentioned first embodiment, the search result range is narrowed with an increase in the number of feature amounts updated with elapsed time, and the search unit 110 conducts the search refinement on the previous search results. As a result, the search processing can be conducted at high speed. Furthermore, as in the above-mentioned first embodiment, the search unit 110 terminates the search processing if the number of persons within the search result range narrowed with the elapsed time is equal to or lower than the given number, and notifies the user of the search results through the display notifying unit 111. As a result, the search unit 110 can provide the user with the search results at an earlier stage.

Third Embodiment

Figure 18:
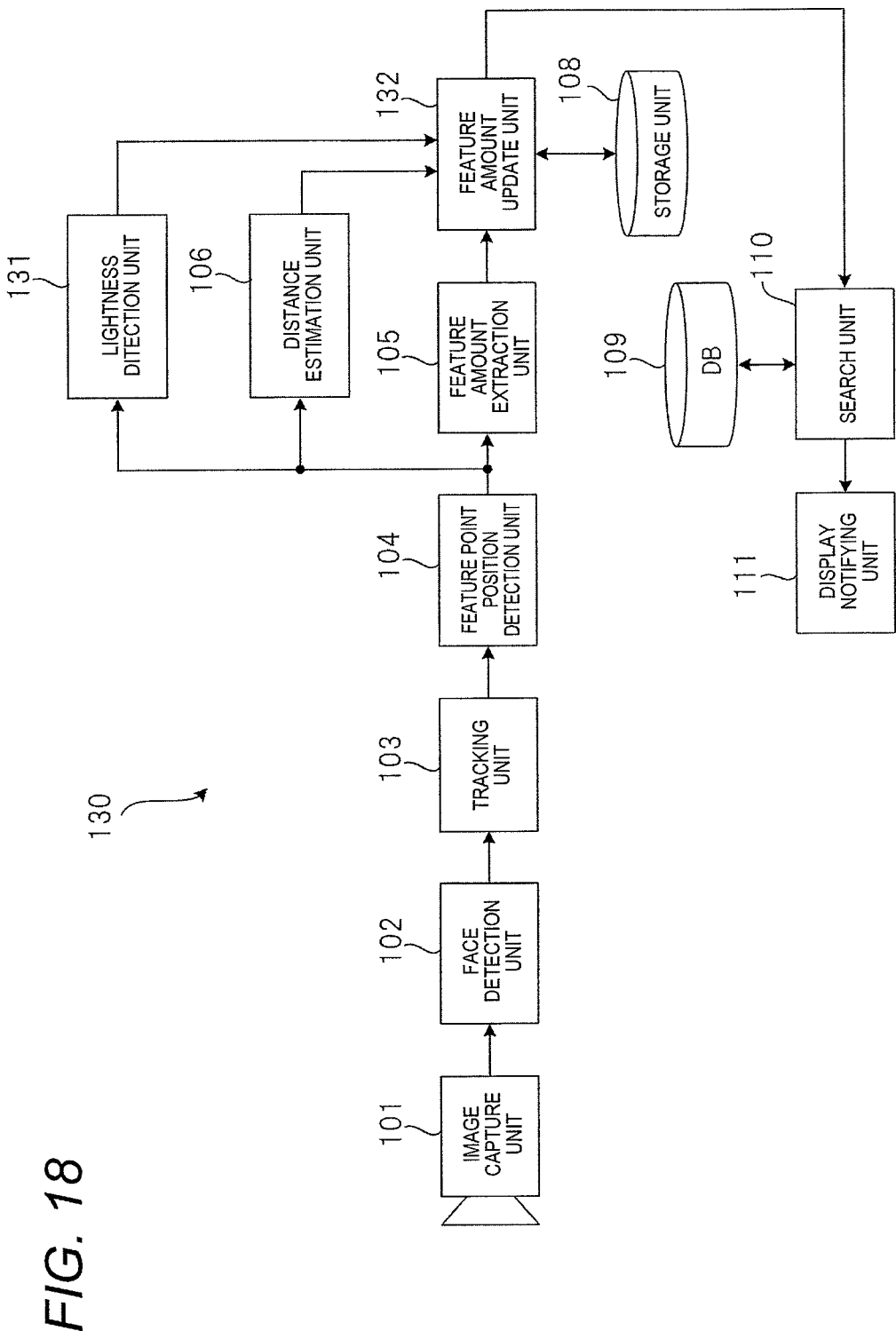
FIG. 18 is a block diagram illustrating an outline configuration of a face recognition device according to a third embodiment of the present invention.

FIG. 18 is a block diagram illustrating an outline configuration of a face recognition device according to a third embodiment of the present invention. In the figure, parts common to those of the face recognition device 100 according to the above-mentioned first embodiment are denoted by the same symbols.

In FIG. 18, a face recognition device 130 according to the third embodiment adds a lightness detection unit 131 to the same configuration as that of the face recognition device 100 according to the above-mentioned first embodiment. The lightness detection unit 131 detects lightness, and detects the lightness at the position of each feature point which is detected by the feature point position detection unit 104 from the face area image.

Figure 19:
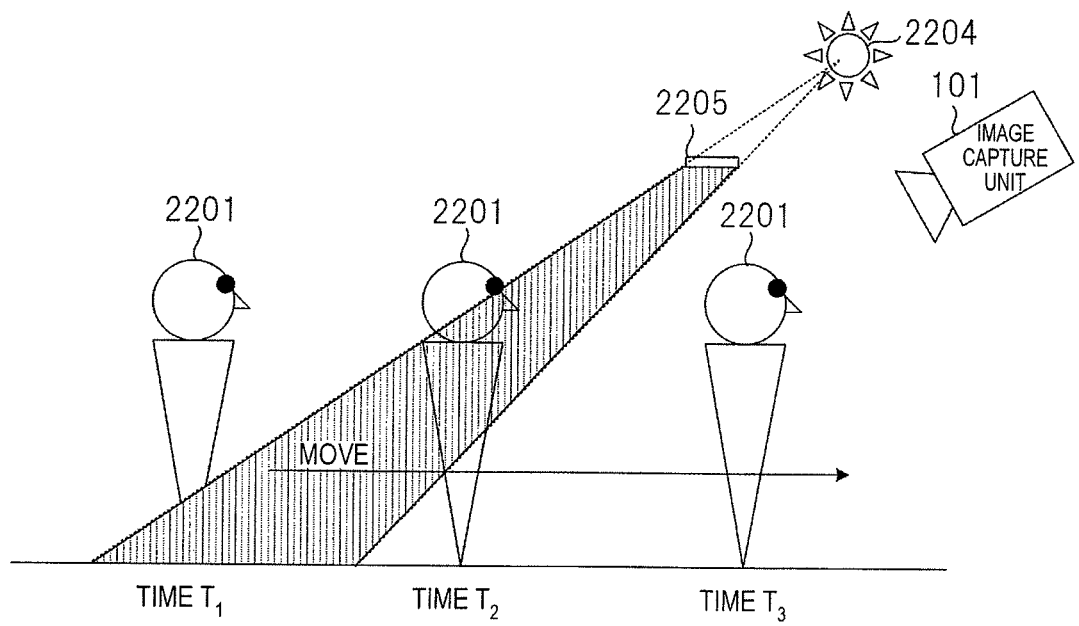
FIG. 19 is a diagram illustrating a relationship between a person of which an image is captured by the face recognition device in FIG. 18 and an image capture unit.

FIG. 19 is a diagram illustrating a relationship between a person captured by the face recognition device 130 of the third embodiment and the image capture unit 101. A person 2201 moves toward a direction in which the image capture unit 101 is installed. That is, the person 2201 moves toward the image capture unit 101 from left to right in the figure. The image capture unit 101 captures the person 2201 at the time $T_1$, the time $T_2$, and the time $T_3$. A light blocking member 2205 that blocks a light of the sun 2204 which is a light source is disposed above the person 2201, and a part of the face of the person 2201 at the time $T_2$ is illuminated with the light from the sun 2204.

Figure 20:
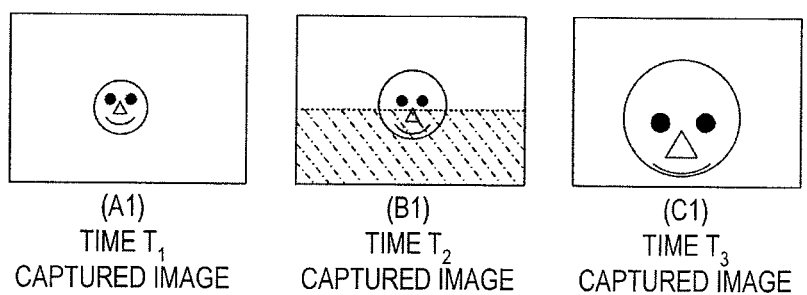
FIG. 20 is a diagram illustrating images captured at a time $T_1$, a time $T_2$, and a time $T_3$ in the face recognition device of FIG. 18.

FIG. 20 is a diagram illustrating images captured at the time $T_1$, the time $T_2$, and the time $T_3$ in the face recognition device 130 according to the third embodiment. In the figure, (A1) is a captured image at the time $T_1$, (B1) is a captured image at the time $T_2$, and (C1) is a captured image at the time $T_3$. As the person 2201 comes closer to the image capture unit 101, the captured image becomes larger, and the face is gradually turned downward due to the existence of the depression angle.

The image capture unit 101 captures the person 2201 at the respective times T in FIG. 19. As a result, the captured image in (A1) of FIG. 20 is captured at the time $T_1$, the captured image in (B1) of FIG. 20 is captured at the time $T_2$, and the captured image in (C1) of FIG. 20 is captured at the time $T_3$. As illustrated in the captured image of the time $T_2$ in (B1), because a lower half of the face of the person 2201 is not illuminated with the light, the lower half is darkened.

The processing of the face detection unit 102, the tracking unit 103, the feature point position detection unit 104, the feature amount extraction unit 105, and the distance estimation unit 106 is identical with that in the above-mentioned first embodiment, and therefore a description thereof will be omitted.

The lightness detection unit 131 detects the lightness at each of the feature point positions of the face which are detected by the feature point position detection unit 104. In general, the image captured by an imaging device such as a camera is an RGB or brightness (gray scale) image. A G-value and a brightness value of RGB are substantially equal to the lightness, and the G-value or the brightness value of the image may be applied as the lightness as it is without any problem. A mean value of the G-value or the brightness value of the pixels within a predetermined range centered on each of the feature point positions is used as the lightness. The lightness detection unit 131 detects and outputs the lightness at each of the feature point positions by using the above lightness detection method. The lightness detection method is given by way of example, and the lightness detection method used in the present invention is not limited to the lightness detection method. Any method is applicable if the lightness of the feature point positions can be detected.

Figure 21:
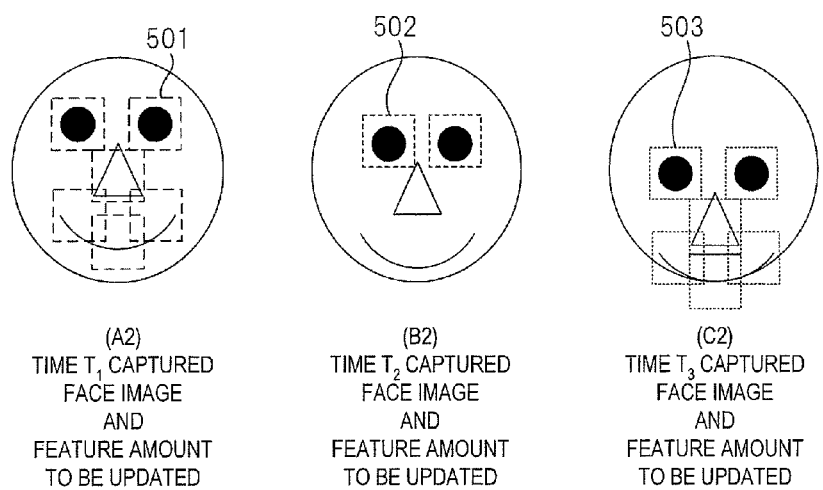
FIG. 21 is a diagram illustrating an example of the feature amount updated by a feature amount update unit in the face recognition device of FIG. 18.

A feature amount update unit 132 updates a part of feature amount of the face of the same person, which is extracted by the feature amount extraction unit 105. FIG. 21 is a diagram illustrating an example of the feature amount updated by the feature amount update unit 132. In the figure, (A2), (B2), and (C2) correspond to the images (A1), (B1), and (C1) captured by the image capture unit 101 illustrated in FIG. 20 at the respective times T, respectively. In the image captured at the time $T_1$ illustrated in (A2) of FIG. 21, the distance between the image capture unit 101 and the face is longer, and the size of the face image is smaller. In this case, as in the above-mentioned first embodiment, only the feature amount 501 of the low frequency component at the feature point positions is updated. Also, in the image captured at the time $T_1$ illustrated in (A2) of FIG. 21, the respective parts of the face are illuminated with the light, and the lightness at each of the feature points, which is output by the lightness detection unit 131, also becomes a value equal to or higher than a predetermined value. In this case, the feature amount update unit 132 updates the feature amounts of the feature points of the respective parts of the face. This is because it is assumed that the face image of the lightness having a given value or higher is input in the general face authentication, and in this case, the face authentication precision is high.

In the image captured at the time $T_2$ illustrated in (B2) of FIG. 21, the distance between the image capture unit 101 and the face of the person is shorter than that illustrated in (A2), and the size of the face image is larger. In this case, as in the above-mentioned first embodiment, only the feature amount 502 of the intermediate frequency component at the feature point positions is updated. Also, in the image captured at the time $T_2$ illustrated in (B2) of FIG. 21, only the parts of the upper portion of the face is illuminated with the right, and only the lightness of the feature points of the parts on the upper portion, which is output by the lightness detection unit 131, becomes the value equal to or higher than the predetermined value. In this case, only the feature amount of the feature points of the parts on the right side of the face is updated.

In the image captured at the time $T_3$ illustrated in (C2) of FIG. 21, the distance between the image capture unit 101 and the face of the person is shorter than (B2), and the size of the face image is larger. In this case, as in the above-mentioned first embodiment, only the feature amount 503 of the high frequency component at the feature point positions is updated. Also, in the image captured at the time $T_3$ illustrated in (C2) of FIG. 21, the respective parts of the face are illuminated with the light, and the lightness of the respective feature points, which is output by the lightness detection unit 131, also becomes the value equal to or higher than the predetermined value. In this case, the feature amount of the feature points of the respective parts on the face is updated. As described above, the feature amount update unit 132 updates only the feature amount of the frequency component with high reliability, and only the feature amount of the feature point positions with high face authentication precision, and with the brightness of a value equal to or higher than the predetermined value, as in the above-mentioned first embodiment.

Figure 22:
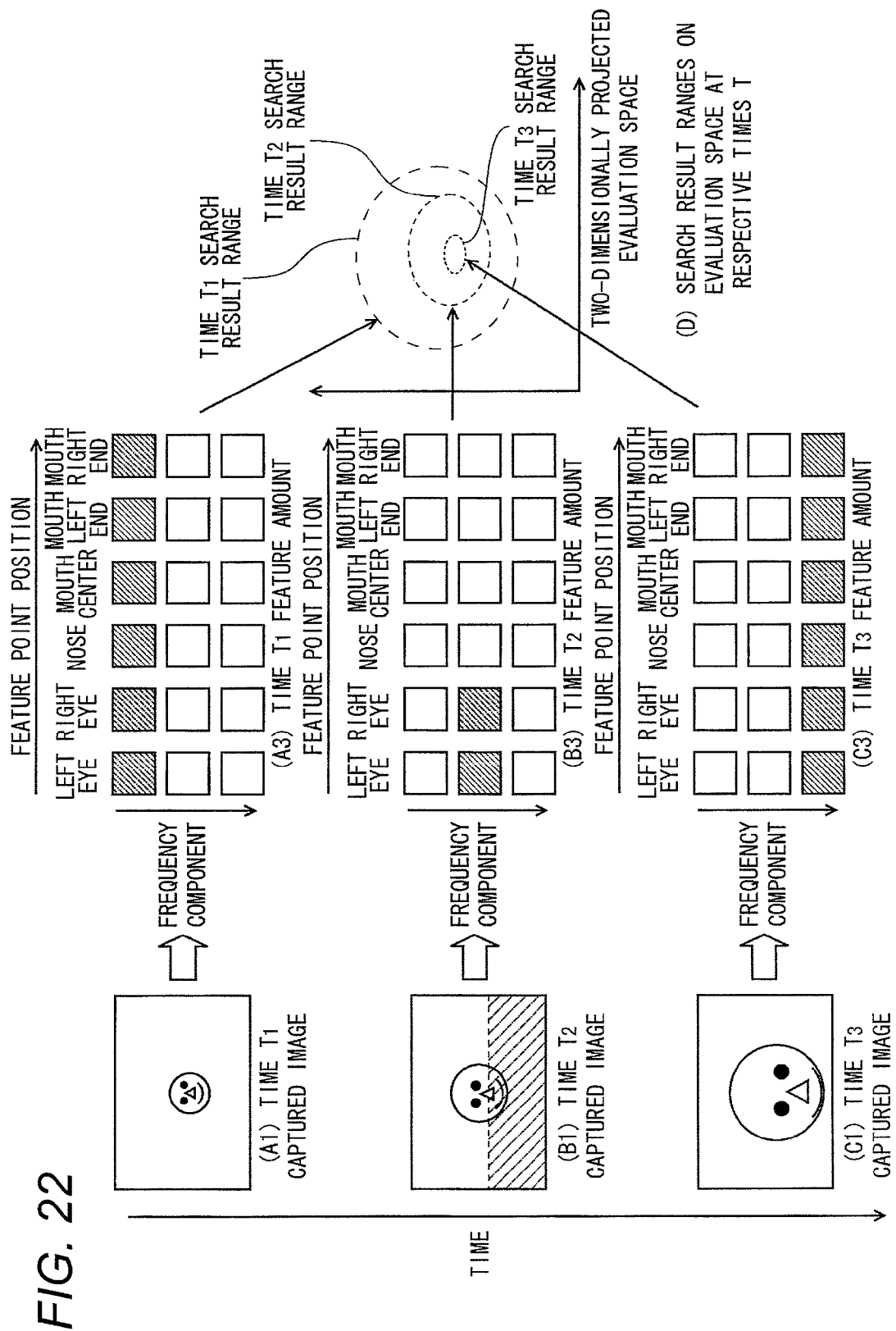
FIG. 22 is a diagram illustrating an example of captured images which are captured by the face recognition device of FIG. 18, feature amounts, and ranges on an evaluation space at the time $T_1$, the time $T_2$, and the time $T_3$.

The operation of the storage unit 108, the search unit 110, the database 109, and the display notifying unit 111 is identical with that in the face recognition device 100 of the above-mentioned first embodiment, and will be described below in brief. FIG. 22 is a diagram illustrating an example of the captured images captured by the face recognition device 130, the feature amounts, and the ranges on the evaluation space at the times $T_1$, $T_2$, and $T_3$. In the figure, (A1), (B1), and (C1) are the images (A1), (B1), and (C1)

captured by the image capture unit 101 illustrated in FIG. 20 at the respective times T. The feature amounts represented in (A3), (B3), and (C3) of FIG. 22 at the respective times T are the feature amounts updated by the feature amount update unit 132. The updated feature mounts are shaded (with chain lines). In FIG. 22, (D) is a diagram illustrating an image when the search result ranges on the evaluation space represented by (Mathematical Formula 2) at the respective times T are projected in a two-dimensional space.

According to the above-mentioned operation to the feature amount update unit 132, as illustrated in (A3), (B3), and (C3) of FIG. 22, as in the above-mentioned first embodiment, the feature amounts of the low frequency component, the intermediate frequency component, and the high frequency component at the respective feature point positions, are sequentially updated with elapsed time. Also, only the feature amount of the feature point positions with the lightness of the value equal to or larger than the predetermined value is updated. In the search unit 110, the operation of the frequency components of the unupdated feature points is excluded from the calculation of (Mathematical Formula 2), and the individuals having the evaluation score of the given value or higher calculated are determined as the search results. Therefore, as illustrated in (D) of FIG. 22, the ranges on the evaluation space output as the search results become gradually narrowed.

Figure 23:
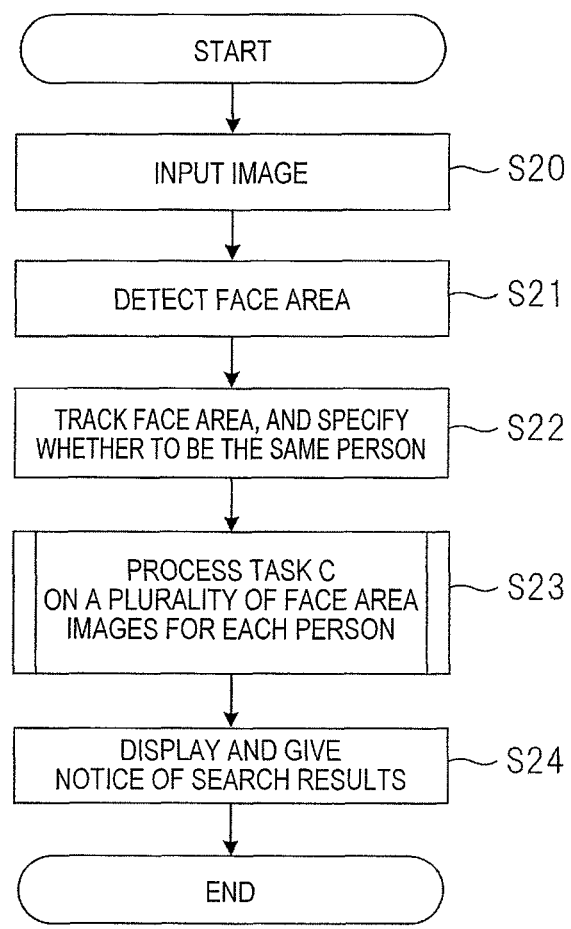
FIG. 23 is a flowchart illustrating main processing in the face recognition device of FIG. 18.

FIG. 23 is a flowchart illustrating main processing in the face recognition device 130 according to the third embodiment. In the figure, the image capture unit 101 first imports an image on which the person is captured (Step S20). Then, the face detection unit 102 detects the face area of the person from the image imported by the image capture unit 101 (Step S21). Upon detection of the face area of the person, the tracking unit 103 tracks the face area, and specifies whether the face area is of the same person, or not (Step S22). Then, the feature point position detection unit 104, the feature amount extraction unit 105, the distance estimation unit 106, the lightness detection unit 131, the feature amount update unit 132, and the search unit 110 processes a task C on a plurality of face area images for each person (Step S23). After the processing of the task C has been conducted, the search results by the processing of the task C are displayed, and notified the user of (Step S24).

Figure 24:
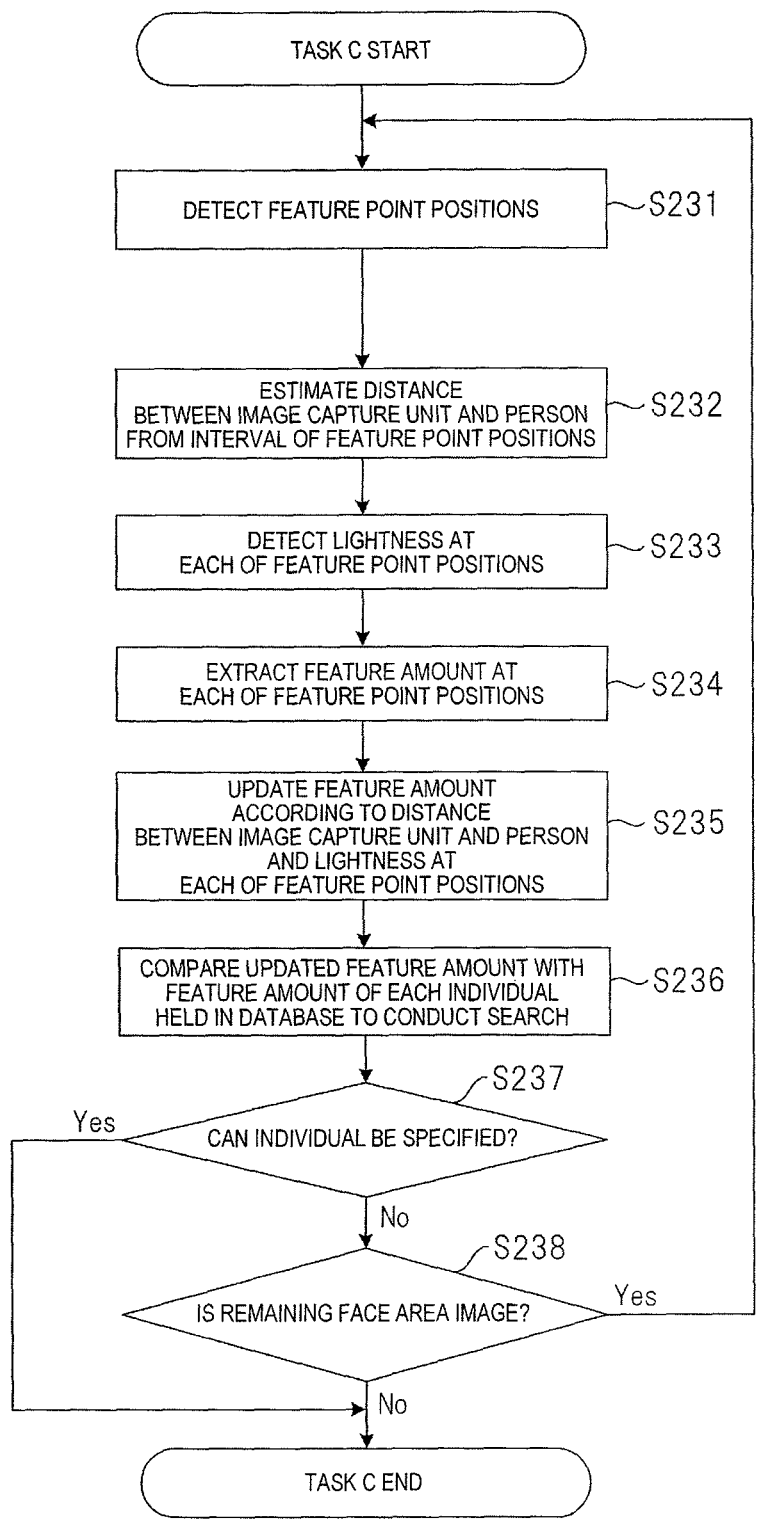
FIG. 24 is a flowchart illustrating processing of a task C in the main processing of FIG. 23.

FIG. 24 is a flowchart illustrating processing of the task C. In the figure, the feature point position detection unit 104 detects the feature point positions within the face of the person which is detected by the face detection unit 102 (Step S231). Then, the distance estimation unit 106 estimates the distance between the image capture unit 101 and the face of the person from the interval of the feature point positions detected by the feature point position detection unit 104 (Step S232). Then, the lightness detection unit 131 detects the lightness at each of the feature point positions detected by the feature point position detection unit 104 (Step 233). Further, the feature amount extraction unit 105 extracts the feature amount at each of the feature point positions detected by the feature point position detection unit 104 (Step S234).

The distance estimation unit 106 estimates the distance between the image capture unit 101 and the person, the lightness detection unit 131 detects the lightness at each of the feature point positions, and the feature amount extraction unit 105 extracts the feature amount at each of the feature point positions. Thereafter, the feature amount update unit 132 updates the feature amount extracted by the feature amount extraction unit 105 according to the distance estimated by the distance estimation unit 106 and the lightness detected by the lightness detection unit 131 (Step S235).

After the feature amount has been updated according to the distance between the image capture unit 101 and the face, and the lightness at each of the feature point positions, the search unit 110 compares the feature amount updated by the feature amount update unit 132 with the feature amount of each individual held by the database 109 to conduct search (Step S236). Then, the search unit 110 determines whether the individual can be specified by the comparison and search processing, or not (Step S237). If the individual can be specified by this determination, the search unit 110 completes this processing, and if the individual cannot be specified, the search unit 110 determines whether there is a remaining face area image, or not (Step S238). If there is no remaining face area image as a result of the determination, the search unit 110 completes this processing. If there is the remaining face area image, the search unit 110 returns to Step S231, and repeats the same processing as described above.

Thus, according to the face recognition device 130 of the third embodiment, the distance estimation unit 106 estimates the distance between the image capture unit 101 and the face of the person. Also, the lightness detection unit 131 detects the lightness at each of the feature point positions within the face. According to the estimated distance and the detected lightness, the feature amount update unit 132 updates the feature amount at each of the feature point positions within the face, and the search unit 110 compares the feature amount updated by the feature amount update unit 132 with the feature amount of each individual held in the database 109 to conduct search. As a result, the face of the person can be recognized with high precision. Further, as in the above-mentioned first embodiment, the search result range is narrowed with an increase in the number of feature amounts updated with elapsed time, and the search unit 110 conducts the search refinement on the previous search results. As a result, the search processing can be conducted at high speed. Furthermore, as in the above-mentioned first embodiment, the search unit 110 terminates the search processing if the number of persons within the search result range narrowed with the elapsed time is equal to or lower than the given number, and notifies the user of the search results through the display notifying unit 111. As a result, the search unit 110 can provide the user with the search results at an earlier stage.

In the above first to third embodiments, the face of the person is recognized. However, the object is not limited to the face of the person, but any other object can be recognized if the object is movable.

The present invention has been described in detail and with reference to the specific embodiments. However, it would be apparent to an ordinary skilled person that various changes and modifications can be made on the present invention without departing from the spirit and scope of the present invention.

The present invention is based on Japanese Patent Application No. 2010-077418 filed on Mar. 30, 2010, and content thereof is incorporated herein by reference.

INDUSTRIAL APPLICABILITY

The present invention has such an advantage that a given area of the object such as the face of the person can be recognized from the image obtained by image capture with high precision, and is applicable to a camera system for security or guest management of major clients.

DESCRIPTION OF REFERENCE SIGNS

100, 120, 130: Face Recognition Device
101: Image Capture Unit

102: Face Detection Unit
103: Tracking Unit
104: Feature Point Position Detection Unit
105: Feature Amount Extraction Unit
106: Distance Estimation Unit
107, 122, 132: Feature Amount Update Unit
108: Storage Unit
109: Database
110: Search Unit
111: Display Notifying Unit
121: Angle Estimation Unit
131: Lightness Detection Unit
201, 1201, 2201: Person
2204: Sun
2205: Light Blocking Member

The invention claimed is:

1. A face recognition device, comprising:
an image capturer that captures an image of an object;
a memory;
a processor, including, an area detector that detects a given area of the object based on an image obtained as an image capture result of the image capturer;
a feature amount extractor that extracts a feature amount within the given area detected by the area detector;
a distance estimator that estimates a distance between the image capturer and the given area; and
wherein a feature amount updater updates the feature amount extracted by the feature amount extractor within the given area at a different frequency component contained in the image, dependent upon a size of search result ranges that corresponds to the distance between the image capturer and the given area estimated by the distance estimator.

2. The face recognition device according to claim 1, the processor further comprising:
a searcher that compares the feature amount updated by the feature amount updater with a feature amount held in advance to conduct a search,
wherein the given area is recognized based on a search result of the searcher.

3. The face recognition device according to claim 1, the processor further comprising:
a feature point position detector that detects feature point positions within the given area,
wherein the distance estimator estimates the distance between the image capturer and the given area based on an interval of the feature point positions detected by the feature point position detector.

4. The face recognition device according to claim 2,
wherein the object is a person, and the given area of the object is a face of the person, and
wherein said face recognition device further comprises a feature point position detector that detects feature point positions within the face detected by the area detector.

5. The face recognition device according to claim 4,
wherein the distance estimator estimates the distance between the image capturer and the face based on an interval of the feature point positions detected by the feature point position detector.

6. The face recognition device according to claim 5, the processor further comprising:
an angle estimator that estimates a direction of the face,
wherein the feature amount updater updates the feature amount extracted by the feature amount extractor based on the distance estimated by the distance estimator and the direction of the face estimated by the angle estimator.

7. The face recognition device according to claim 6,
wherein the angle estimator estimates the direction of the face based on a positional relationship of the feature point positions detected by the feature point position detector.

8. The face recognition device according to claim 5, the processor further comprising:
a lightness detector that detects a lightness at each of the feature point positions detected by the feature point position detector,
wherein the feature amount updater updates the feature amount extracted by the feature amount extractor based on the distance estimated by the distance estimator and the lightness at each of the feature point positions detected by the lightness detector.

9. The face recognition device according to claim 1,
wherein in a case in which the estimated distance is short, the feature amount updater updates the feature amount of only a frequency component lower than in a case in which the estimated distance is long.

10. A face recognition method, comprising:
capturing an image of an object using an image capturer;
detecting a given area of the object based on the obtained image;
extracting a feature amount within the detected given area;
estimating a distance between the image capturer and the detected given area; and
updating the extracted feature amount within the detected given area at a different frequency component contained in the image, dependent upon a size of search result ranges that corresponds to the estimated distance between the image capturer and the detected given area.

11. The face recognition method according to claim 10,
wherein in a case in which the estimated distance is short, the feature amount of only a frequency component lower is updated than in a case in which the estimated distance is long.

* * * * *